(12) United States Patent
Chen et al.

(10) Patent No.: US 10,855,153 B2
(45) Date of Patent: Dec. 1, 2020

(54) ELECTRIC VEHICLE INDUCTION MACHINE

(71) Applicant: SF Motors, Inc., Santa Clara, CA (US)

(72) Inventors: Justin Chen, Santa Clara, CA (US);
Zhichun Ma, Santa Clara, CA (US);
Duanyang Wang, Santa Clara, CA (US); Yifan Tang, Santa Clara, CA (US); Yin Wang, Santa Clara, CA (US)

(73) Assignee: SF Motors, Inc., Santa Clara, CA (US)

(*) Notice: Subject to any disclaimer, the term of this patent is extended or adjusted under 35 U.S.C. 154(b) by 0 days.

(21) Appl. No.: 16/385,992

(22) Filed: Apr. 16, 2019

(65) Prior Publication Data

US 2020/0336055 A1 Oct. 22, 2020

(51) Int. Cl.
| | |
|---|---|
| *H02K 17/16* | (2006.01) |
| *H02K 7/00* | (2006.01) |
| *H02K 15/00* | (2006.01) |
| *B22D 13/02* | (2006.01) |
| *B22D 19/00* | (2006.01) |
| *B60L 50/51* | (2019.01) |

(52) U.S. Cl.
CPC ......... *H02K 17/165* (2013.01); *B22D 13/026* (2013.01); *B22D 19/0054* (2013.01); *B60L 50/51* (2019.02); *H02K 7/006* (2013.01); *H02K 15/0012* (2013.01); *B60L 2220/12* (2013.01)

(58) Field of Classification Search
CPC .. H02K 17/165; H02K 7/006; H02K 15/0012; B60L 50/51; B60L 2220/12; B22D 19/0054; B22D 13/026

USPC ......................................................... 310/211
See application file for complete search history.

(56) References Cited

U.S. PATENT DOCUMENTS

| | | | | |
|---|---|---|---|---|
| 2,991,378 A | * | 7/1961 | Barney | H02K 15/0012 |
| | | | | 310/211 |
| 3,670,238 A | * | 6/1972 | Ronk | H02K 47/18 |
| | | | | 363/150 |
| 4,064,410 A | * | 12/1977 | Roach | H02K 15/0012 |
| | | | | 310/211 |
| 4,131,990 A | * | 1/1979 | Roach | H02K 15/0012 |
| | | | | 228/185 |
| 8,347,485 B2 | * | 1/2013 | Biederman | B22C 9/04 |
| | | | | 164/103 |
| 9,899,900 B2 | * | 2/2018 | Mayer | H02K 19/04 |

(Continued)

*Primary Examiner* — John K Kim
(74) *Attorney, Agent, or Firm* — Foley & Lardner LLP; James De Vellis

(57) ABSTRACT

Provided herein are systems, apparatuses, and methods of providing a centrifugally cast rotor assembly for an induction motor of an electric vehicle. The rotor assembly includes a rotor lamination stack with a cylindrical shape that terminates in a first end surface and a second end surface. The rotor lamination stack has multiple lamination discs, and each lamination disc has multiple rotor slots. The rotor assembly further includes copper bars disposed within the rotor slots, a first intermediary end ring disposed at the first end surface, and a second intermediary end ring disposed at the second end surface. A centrifugally cast first copper end ring that electrically and mechanically couples each of the copper bars is located proximate the first end surface, and a centrifugally cast second copper end ring that electrically and mechanically couples each of the copper bars is located proximate the second end surface.

11 Claims, 20 Drawing Sheets

(56) References Cited

U.S. PATENT DOCUMENTS

| | | | | |
|---|---|---|---|---|
| 2005/0134137 A1* | 6/2005 | Sweo | ............... | H02K 15/0012 310/211 |
| 2006/0273683 A1* | 12/2006 | Caprio | ............... | H02K 17/165 310/211 |
| 2010/0141080 A1* | 6/2010 | Tang | ............... | H02K 1/165 310/216.111 |
| 2011/0210692 A1* | 9/2011 | Nishihama | ........... | H02K 17/165 318/767 |
| 2012/0038236 A1* | 2/2012 | Tajima | ............... | H02K 1/2766 310/156.43 |
| 2012/0043849 A1* | 2/2012 | Yoneda | ............... | H02K 1/16 310/216.092 |
| 2012/0104894 A1* | 5/2012 | Van Den Bossche | ... | H02K 1/14 310/216.011 |
| 2012/0217839 A1* | 8/2012 | Kajiya | ............... | H02K 17/16 310/211 |
| 2012/0293036 A1* | 11/2012 | Kleber | ............... | H02K 15/0012 310/211 |
| 2013/0049518 A1* | 2/2013 | Kleber | ............... | H02K 17/165 310/211 |
| 2013/0169074 A1* | 7/2013 | Hussain | ............... | H02K 5/128 310/49.43 |
| 2014/0246943 A1* | 9/2014 | Omekanda | ............... | B60L 1/00 310/211 |
| 2015/0084473 A1* | 3/2015 | Tomioka | ............ | H02K 15/0012 310/211 |
| 2015/0343525 A1* | 12/2015 | Lee | ............... | B22D 13/04 164/118 |
| 2016/0211731 A1* | 7/2016 | Mayer | ............... | H02K 15/0012 |

* cited by examiner

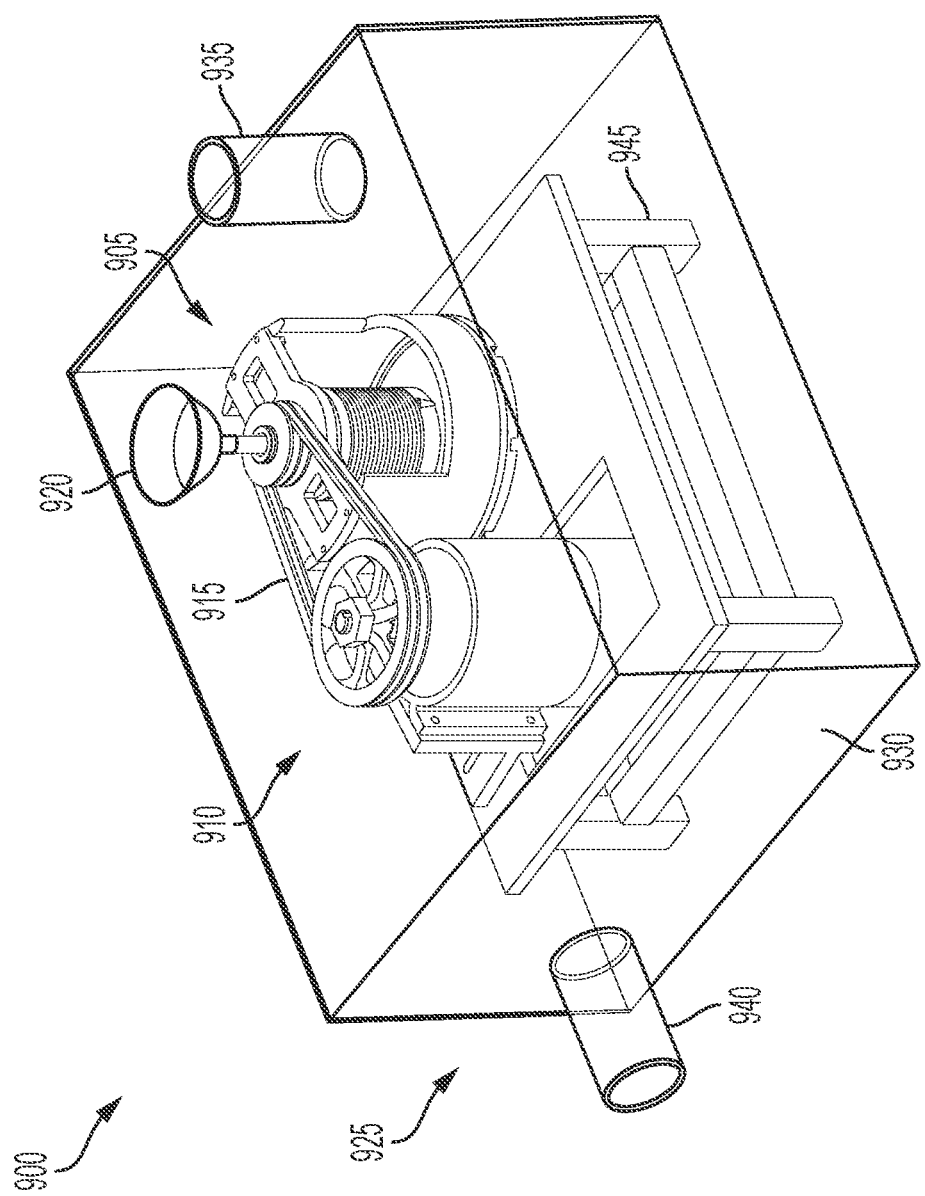

ELECTRIC VEHICLE INDUCTION MACHINE

BACKGROUND

Vehicles such as electric vehicles can obtain power via drive systems. These drive systems can provide power to components of the vehicles.

SUMMARY

At least one aspect is directed to a rotor assembly for an induction motor of an electric vehicle. The rotor assembly includes a rotor lamination stack with a cylindrical shape that defines a central axis. The rotor lamination stack terminates in a first end surface and a second end surface, and a central axial bore extends from the first end surface to the second end surface. The rotor lamination stack has multiple lamination discs. Each lamination disc has multiple rotor slots. The rotor assembly further includes copper bars disposed within the rotor slots. Each of the copper bars extends beyond the first end surface of the rotor lamination stack and beyond the second end surface of the rotor lamination stack. The rotor assembly further includes a first intermediary end ring disposed at the first end surface of the rotor lamination stack, and a second intermediary end ring disposed at the second end surface of the rotor lamination stack. The rotor assembly further includes a centrifugally cast first copper end ring that electrically and mechanically couples each of the copper bars proximate the first end surface of the rotor lamination stack and a centrifugally cast second copper end ring that electrically and mechanically couples each of the copper bars proximate the second end surface of the rotor lamination stack. Each of the centrifugally cast first copper end ring and the centrifugally cast second copper end ring can be centrifugally casted with the copper bars are inserted into the rotor slots.

At least one aspect is directed to a method. The method can include providing centrifugally cast copper rotor assemblies for induction motors of electric vehicles. The method can include stacking multiple lamination discs to form a rotor core assembly with a cylindrical shape defining a central axis. The rotor core assembly has a first end, a second end, and a central axial bore extending from the first end to the second end. Each of the lamination discs can include multiple rotor slots. The method can include positioning an inner die component and an outer die component at the first end of the rotor core assembly to form a casting material cavity. The method can include inserting copper bars into the rotor slots. Each copper bar extends beyond a first end surface and a second end surface of the rotor core assembly. The method further includes rotating the rotor core assembly about the central axis and pouring molten copper through the central axial bore and into the casting material cavity to form a first copper cast end ring that electrically and mechanically couples each copper bar proximate the first end of the rotor core assembly.

At least one aspect is directed to an electric vehicle. The electric vehicle can include an induction motor to drive the electric vehicle. The induction motor can include a motor shaft, a stator assembly, and a rotor assembly. The rotor assembly includes a rotor lamination stack with a cylindrical shape that defines a central axis. The rotor lamination stack terminates in a first end surface and a second end surface, and a central axial bore extends from the first end surface to the second end surface. The rotor lamination stack has multiple lamination discs. Each lamination disc has multiple rotor slots. The rotor assembly further includes copper bars disposed within the rotor slots. Each of the copper bars extends beyond the first end surface of the rotor lamination stack and beyond the second end surface of the rotor lamination stack. The rotor assembly further includes a first intermediary end ring disposed at the first end surface of the rotor lamination stack, and a second intermediary end ring disposed at the second end surface of the rotor lamination stack. The rotor assembly further includes a centrifugally cast first copper end ring that electrically and mechanically couples each of the copper bars proximate the first end surface of the rotor lamination stack and a centrifugally cast second copper end ring that electrically and mechanically couples each of the copper bars proximate the second end surface of the rotor lamination stack. Each of the centrifugally cast first copper end ring and the centrifugally cast second copper end ring is formed using a centrifugal casting process after the copper bars are inserted into the rotor slots.

At least one aspect is directed to an apparatus to centrifugally cast copper rotor assemblies for induction motors of electric vehicles. The apparatus can include a rotor assembly. The rotor assembly can have a cylindrical shape that defines a central axis. The rotor assembly can terminate in a first end and a second end. The apparatus can further include an inner die component and an outer die component. Each of the inner die component and the outer die component can be disposed at the first end of the rotor assembly. The apparatus can include a spinner assembly. The spinner assembly can include a lower structure, an upper structure, and a sidewall structure. The lower structure can be disposed beneath the rotor assembly and can include a base plate, a spindle component configured to mate with the outer die component, and a first bearing assembly. The first bearing assembly can include a first inner ring component and a first outer ring component. The first outer ring component can be fixedly coupled with the base plate and the first inner ring component can be fixedly coupled with the spindle component such that the spindle component is permitted to rotate with the rotor assembly about the central axis relative to the base plate. The upper structure can be disposed above the rotor assembly and can include an upper plate, a drive wheel component configured to mate with the rotor assembly, and a second bearing assembly. The second bearing assembly can include a second inner ring component and a second outer ring component. The second outer ring component can be fixedly coupled with the upper plate and the second inner ring component can be fixedly coupled with the drive wheel component such that the drive wheel component is permitted to rotate with the rotor assembly about the central axis relative to the upper plate. The sidewall structure can couple the lower structure to the upper structure. The apparatus can further include a motor that can drive rotation of the drive wheel component.

At least one aspect is directed to a spinner assembly of a centrifugal casting process of a rotor assembly used in an induction motor of an electric vehicle. The spinner assembly can include a lower structure, an upper structure, and a sidewall structure. The lower structure can be disposed beneath the rotor assembly and can include a base plate, a spindle component configured to mate with the outer die component, and a first bearing assembly. The first bearing assembly can include a first inner ring component and a first outer ring component. The first outer ring component can be fixedly coupled with the base plate and the first inner ring component can be fixedly coupled with the spindle component such that the spindle component is permitted to rotate with the rotor assembly about the central axis relative to the base plate. The upper structure can be disposed above the rotor assembly and can include an upper plate, a drive wheel component configured to mate with the rotor assembly, and a second bearing assembly. The second bearing assembly can include a second inner ring component and a second outer ring component. The second outer ring component can be fixedly coupled with the upper plate and the second inner ring component can be fixedly coupled with the drive wheel component such that the drive wheel component is permitted to rotate with the rotor assembly about the central axis relative to the upper plate. The sidewall structure can couple the lower structure to the upper structure.

At least one aspect is directed to a method. The method can include providing a rotor assembly with a cylindrical shape that defines a central axis. The rotor assembly can terminate in a first end and a second end. The method can include providing an inner die component, and providing an outer die component. Each of the inner die component and the outer die component can be disposed at the first end of the rotor assembly. The method can include providing a spinner assembly. The spinner assembly can include a lower structure, an upper structure, and a sidewall structure. The lower structure can be disposed beneath the rotor assembly and can include a base plate, a spindle component configured to mate with the outer die component, and a first bearing assembly. The first bearing assembly can include a first inner ring component and a first outer ring component. The first outer ring component can be fixedly coupled with the base plate and the first inner ring component can be fixedly coupled with the spindle component such that the spindle component is permitted to rotate with the rotor assembly about the central axis relative to the base plate. The upper structure can be disposed above the rotor assembly and can include an upper plate, a drive wheel component configured to mate with the rotor assembly, and a second bearing assembly. The second bearing assembly can include a second inner ring component and a second outer ring component. The second outer ring component can be fixedly coupled with the upper plate and the second inner ring component can be fixedly coupled with the drive wheel component such that the drive wheel component is permitted to rotate with the rotor assembly about the central axis relative to the upper plate. The sidewall structure can couple the lower structure to the upper structure. The method can further include providing a motor that drive rotation of the drive wheel component.

At least one aspect is directed to a method. The method can include providing a spinner assembly. The spinner assembly can include a lower structure, an upper structure, and a sidewall structure. The lower structure can be disposed beneath the rotor assembly and can include a base plate, a spindle component configured to mate with the outer die component, and a first bearing assembly. The first bearing assembly can include a first inner ring component and a first outer ring component. The first outer ring component can be fixedly coupled with the base plate and the first inner ring component can be fixedly coupled with the spindle component such that the spindle component is permitted to rotate with the rotor assembly about the central axis relative to the base plate. The upper structure can be disposed above the rotor assembly and can include an upper plate, a drive wheel component configured to mate with the rotor assembly, and a second bearing assembly. The second bearing assembly can include a second inner ring component and a second outer ring component. The second outer ring component can be fixedly coupled with the upper plate and the second inner ring component can be fixedly coupled with the drive wheel component such that the drive wheel component is permitted to rotate with the rotor assembly about the central axis relative to the upper plate. The sidewall structure can couple the lower structure to the upper structure.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 9 depicts an isometric view of an example centrifugal casting apparatus for a rotor assembly of an induction motor in an electric vehicle;

DETAILED DESCRIPTION

Figure 1:
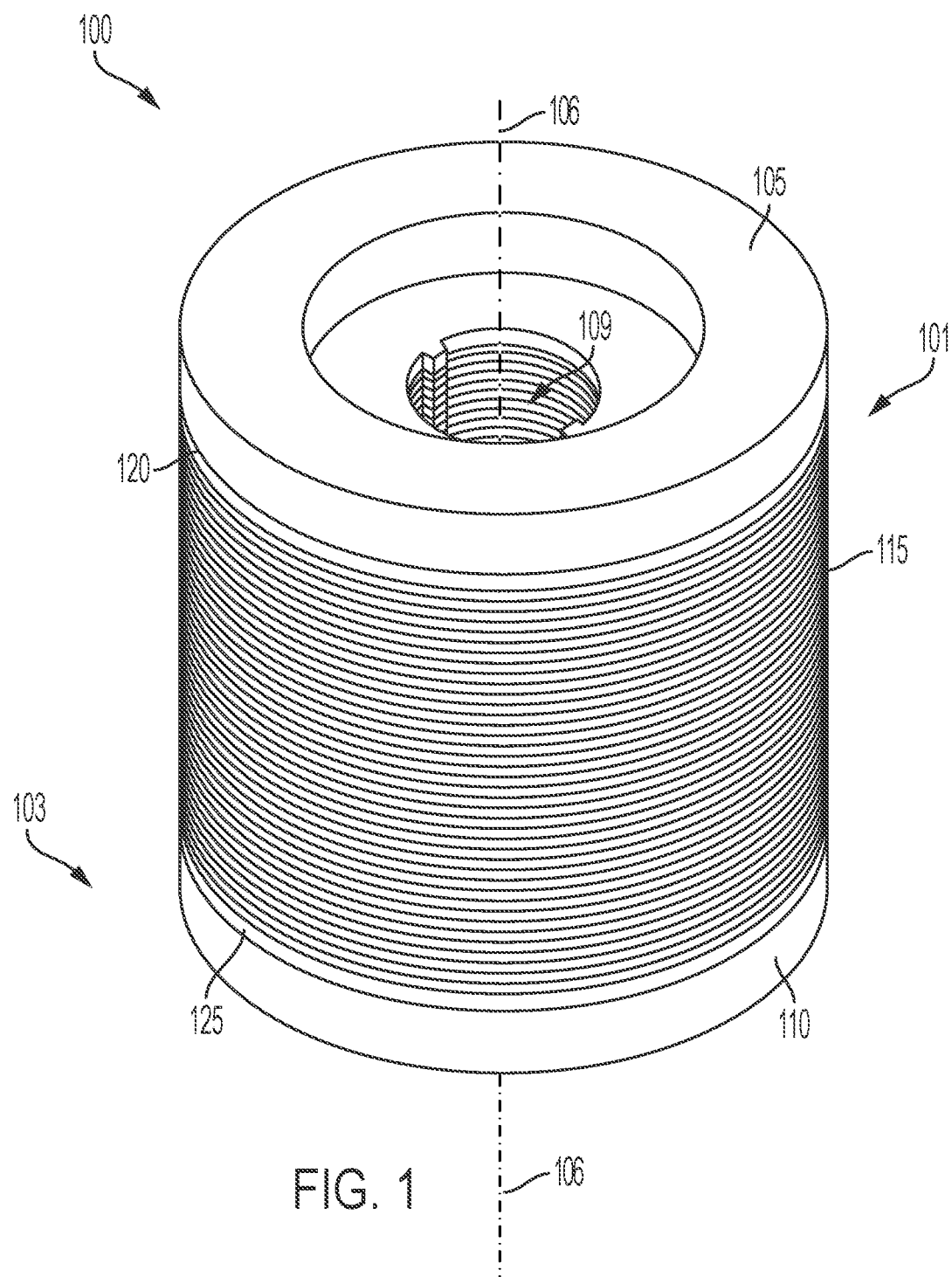
FIG. 1 depicts an isometric view of an example centrifugally cast copper rotor assembly of an induction motor in an electric vehicle.

Following below are more detailed descriptions of various concepts related to, and implementations of a centrifugal casting process for the rotor assemblies of induction motors of electric vehicles. The various concepts introduced above and discussed in greater detail below can be implemented in any of numerous ways.

Systems and methods described herein relate to a centrifugally cast rotor assembly of an induction motor for an electric vehicle. Electric vehicles can include DC motors or AC induction motors to achieve the variable levels of speed and torque required to drive a vehicle. AC induction motors can deliver the performance provided by DC motors as well as the additional benefits associated with AC induction motors, including small size, low cost, high reliability and low maintenance.

Induction motors can include a rotor assembly that rotates relative to a stator assembly. Aluminum or copper can be used to fabricate a squirrel cage structure within the rotor assembly. The aluminum and the copper utilized in the rotor assemblies can be in either pure or alloy form. Aluminum rotors have lower conductivity and lower efficiency than copper rotors. However, copper rotors can be difficult to manufacture. For example, copper rotors manufactured using vacuum or induction brazing methods can suffer from strength and reliability issues when implemented in high speed rotation applications. Similarly, copper rotors manufactured using gravity casting methods can suffer from quality and process issues, for example, high porosity of cast material. In addition, the high temperature required by gravity casting can damage the iron core materials of the rotor, resulting in higher electrical losses and motor performance degradation.

In one aspect, the problem of manufacturing copper rotors can be addressed herein by utilizing a centrifugal casting process. Centrifugal casting provides several advantages over other fabrication methods. The centrifugal casting process is simple and yields high structural quality end rings with good dimensional size control, low porosity, and fine copper grain sizes. The rotor has high structural strength because the copper bars of the squirrel cage can be prefabricated, and only the end rings are formed during the casting process. The centrifugal casting process is well-suited for rotor designs with small and narrow rotor slots, and the rotor has high durability because the casting process forms a good joining interface for the copper bars.

The induction motors described herein are for an automotive configuration. An automotive configuration includes a configuration, arrangement or network of electrical, electronic, mechanical or electromechanical devices within a vehicle of any type. An automotive configuration can include induction motors for use in electric vehicles (EVs). EVs can include electric automobiles, hybrid automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

Figure 2:
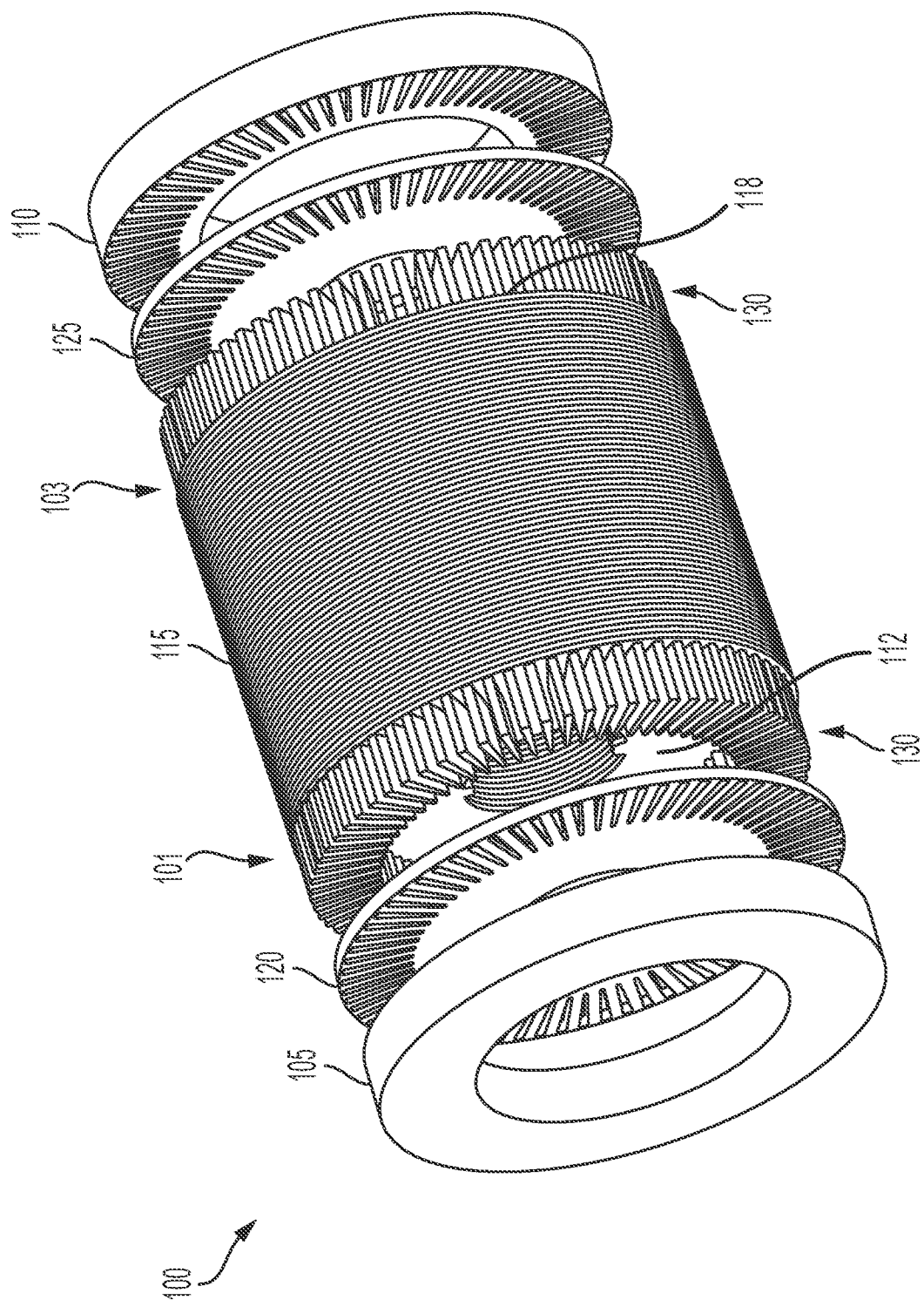
FIG. 2 depicts an exploded isometric view of an example centrifugally cast copper rotor assembly of an induction motor in an electric vehicle.

FIGS. 1 and 2, among others, respectively depict isometric and exploded isometric views of a centrifugally cast copper rotor assembly 100. The centrifugally cast copper rotor assembly 100 can be part of an induction motor that provides the speed and torque required to drive an electric vehicle. The views of FIGS. 1 and 2 do not depict every component of the induction motor. For example, FIGS. 1 and 2 do not show the motor shaft, the stator assembly, or the bearing assemblies of the induction motor. Specifically referring to FIG. 2, although the exploded view presents the components of the rotor assembly 100 as separable, after the centrifugal casting process has been completed, the components can be inseparable as described herein.

The rotor assembly 100 can include a first centrifugally cast copper end ring 105, a first intermediary ring 120, a rotor lamination stack 115, a second intermediary end ring 125, and a second centrifugally cast copper end ring 110. The first centrifugally cast copper end ring 105, the first intermediary ring 120, the rotor lamination stack 115, the second intermediary end ring 125, and the second centrifugally cast copper end ring 110 can be arranged in that order to form the cylindrical shape of the rotor assembly 100. In some instances, the rotor assembly 100 does not include the first intermediary ring 120 and the second intermediary ring 125. In some other instances, a cross-section of the rotor assembly 100 can be other than circular, and can instead be oval, elliptical, rectangular, or any other shape.

Rotor lamination stack 115 can include a plurality of lamination discs disposed on top of each other to form a cylindrical shape that defines a central axis 106. The cylindrical shape of the rotor lamination stack 115 extends from a first end surface 112 proximate a first end 101 to a second end surface 118 proximate a second end 103. The rotor lamination stack 115 can include a range from 100 to 1200 individual lamination discs. Each of the lamination discs can be fabricated from electric steel with a thickness between 0.18 mm and 0.40 mm. Each disc can be formed using a stamping process or any other suitable fabrication technique. For example, each disc can include multiple rotor slots stamped about the outer perimeter of the disc. Each slot can permit the insertion of a copper bar 130. In some instances, each disc is coated with an oxide in order to electrically insulate the metal discs from one another. Alternatively, in some other instances, the discs comprising the rotor lamination stack can be electrically isolated from one another by the inclusion of an electrically insulating spacer disc located between adjacent metal discs.

The first intermediary end ring 120 can be arranged such that an interior (i.e., opposite the end ring 105) surface of the intermediary end ring 120 contacts the first end surface 112 of the rotor lamination stack 115. Similarly, the second intermediary end ring 125 can be arranged such that an interior (i.e., opposite the end ring 110) surface of the intermediary end ring 125 contacts the second end surface 118 of the rotor lamination stack 115. In some instances, each of the first intermediary end ring 120 and the second intermediary end ring 125 is fabricated from stainless steel or electric steel with a thickness ranging from 1 mm to 5 mm. The width of each of the first intermediary end ring 120 and the second intermediary end ring 125 can be substantially identical (±10%) as the width of the rotor lamination stack 115.

Each of the first intermediary end ring 120 and the second intermediary end ring 125 can include multiple rotor slots. In some instances, the rotor slots of the first intermediary end ring 120 and the second intermediary end ring 125 can be slightly larger than the rotor slots of the lamination discs, for example, the width of the rotor slots of the first intermediary end ring 120 and the second intermediary end ring 125 can be 5% larger than the rotor slots of the lamination discs. The rotor slots of the intermediary end rings 120, 125 are intended to align with the rotor slots of the rotor lamination stack 115. In this way, multiple copper bars 130 can be arranged to pass through the first intermediary end ring 120, the rotor lamination stack 115, and the second intermediary end ring 125. For example, in a fully installed configuration, each copper bar 130 can extend a length ranging from 20 mm to 50 mm past the first end surface 112. In some instances, each copper bar 130 extends an equal length past the second end surface 118 in the fully installed configuration. In other instances, each copper bar 130 extends an unequal length past the second end surface 118 in the fully installed configuration.

Each copper bar 130 can have a bar length ranging from 80 mm to 300 mm, a bar height ranging from 10 mm to 25 mm, and a bar width of 3 mm to 15 mm. In some instances, the copper bars 130 are fabricated from oxygen-free electrolytic copper, which can also be referred to as OFE or C10100 copper. OFE copper, which has the highest purity for standardized copper, has a purity grade of 99.99%. As such, it is extremely homogenous, exhibits high thermal and electrical conductivity, and is immune to hydrogen embrittlement. The use of OFE copper bars that are fabricated (e.g., machined) prior to the casting process ensures that the rotor assembly is robust since the use of cast copper bars 130 can result in defects and impurities that can degrade the performance of the rotor. In addition, the pre-insertion of the copper bars 130 into the rotor slots of the rotor lamination stack 115 prior to the initiation of the centrifugal casting process can prevent the molten copper used in the casting process from flowing into the rotor slots of the lamination discs of the rotor lamination stack 115, preventing damage to the lamination discs.

Figure 4:
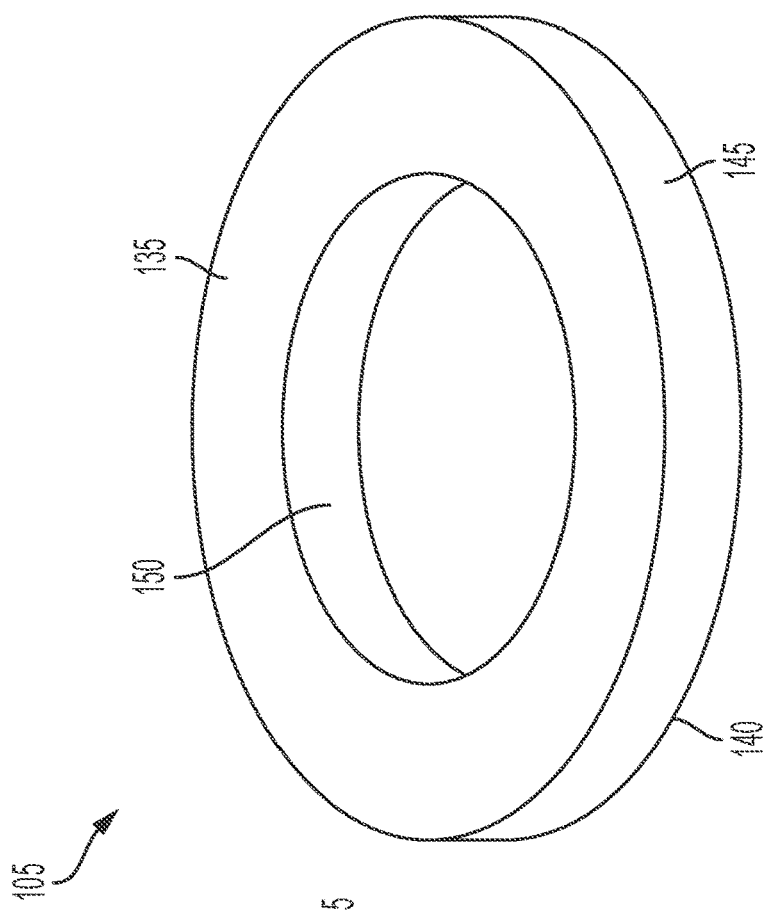
FIG. 4 depicts an isometric view of an example centrifugally cast copper end ring for a rotor assembly of an induction motor in an electric vehicle.
Figure 3:
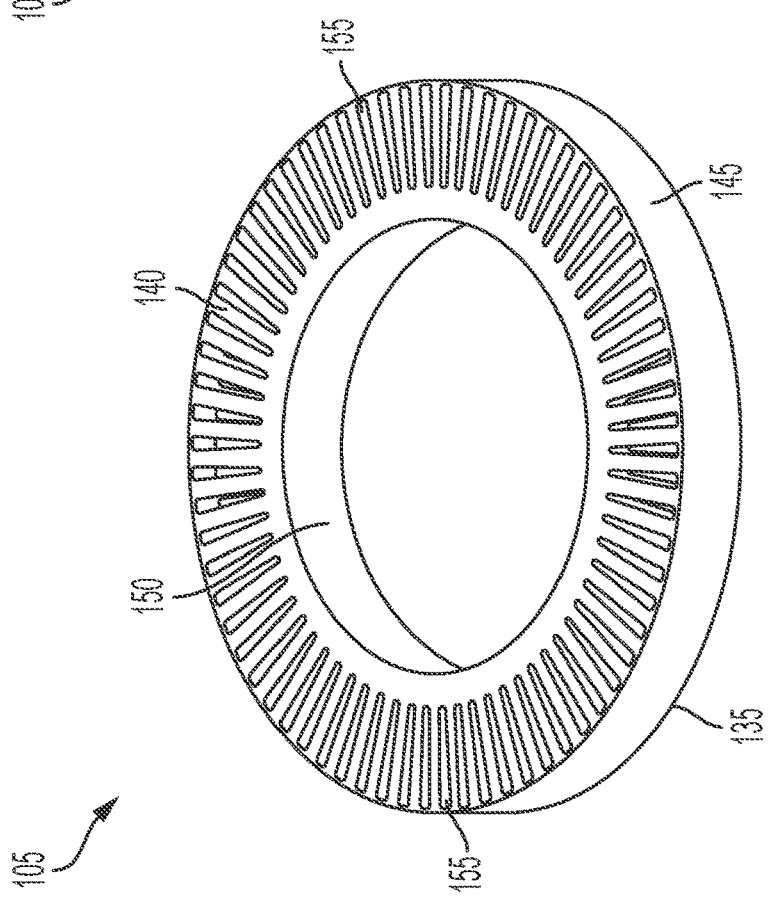
FIG. 3 depicts an isometric view of an example centrifugally cast copper end ring for a rotor assembly of an induction motor in an electric vehicle.

FIGS. 3 and 4, among others, depict isometric views of a first centrifugally cast copper end ring 105 for a rotor assembly 100 of an induction motor in an electric vehicle. Although FIGS. 3 and 4 specifically depict the first end ring 105, all of the description included below is equally applicable to the second end ring 110. With reference to FIG. 2, although FIGS. 3 and 4 depict end rings 105, 110 as separable from the copper bars 130 of the rotor assembly 100, after the centrifugal casting process has been completed, the end rings 105, 110 can be inseparable from the copper bars 130.

The first centrifugally cast copper end ring 105 can be a ring-shaped structure with an exterior face 135, an interior face 140, an outer circumferential face 145, and an inner circumferential face 150. When included as part of the rotor assembly 100, the exterior face 135 can be oriented away from the rotor lamination stack 115, while the interior face 140 can be oriented towards the rotor lamination stack 115. The outer circumferential face 145 can have an outer diameter ranging from 120 mm to 300 mm, while the inner circumferential face 150 can have an inner diameter ranging from 60 mm to 260 mm.

The interior face 140 of the first end ring 105 can include multiple recesses 155 distributed about the interior face 140 near the outer circumferential face 145. The recesses 155 can be formed when cast copper flows and solidifies around the copper bars 130 during the centrifugal casting process. In addition to mechanically and electrically coupling with the copper bars 130, the interior face 140 of the first end ring 105 can contact an exterior surface of the first intermediary end ring 120.

Figure 5:
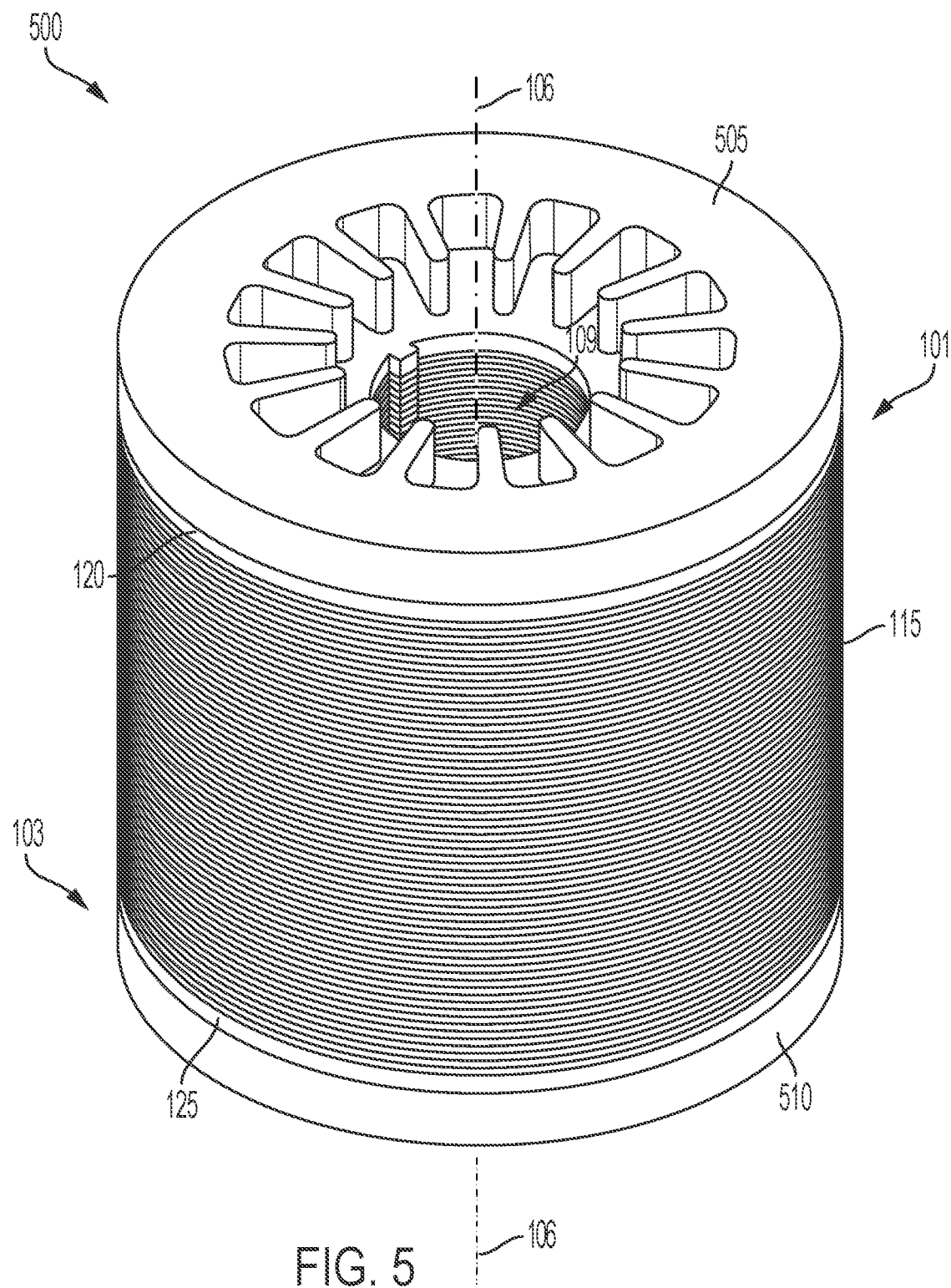
FIG. 5 depicts an isometric view of an example centrifugally cast copper rotor assembly of an induction motor in an electric vehicle.
Figure 6:
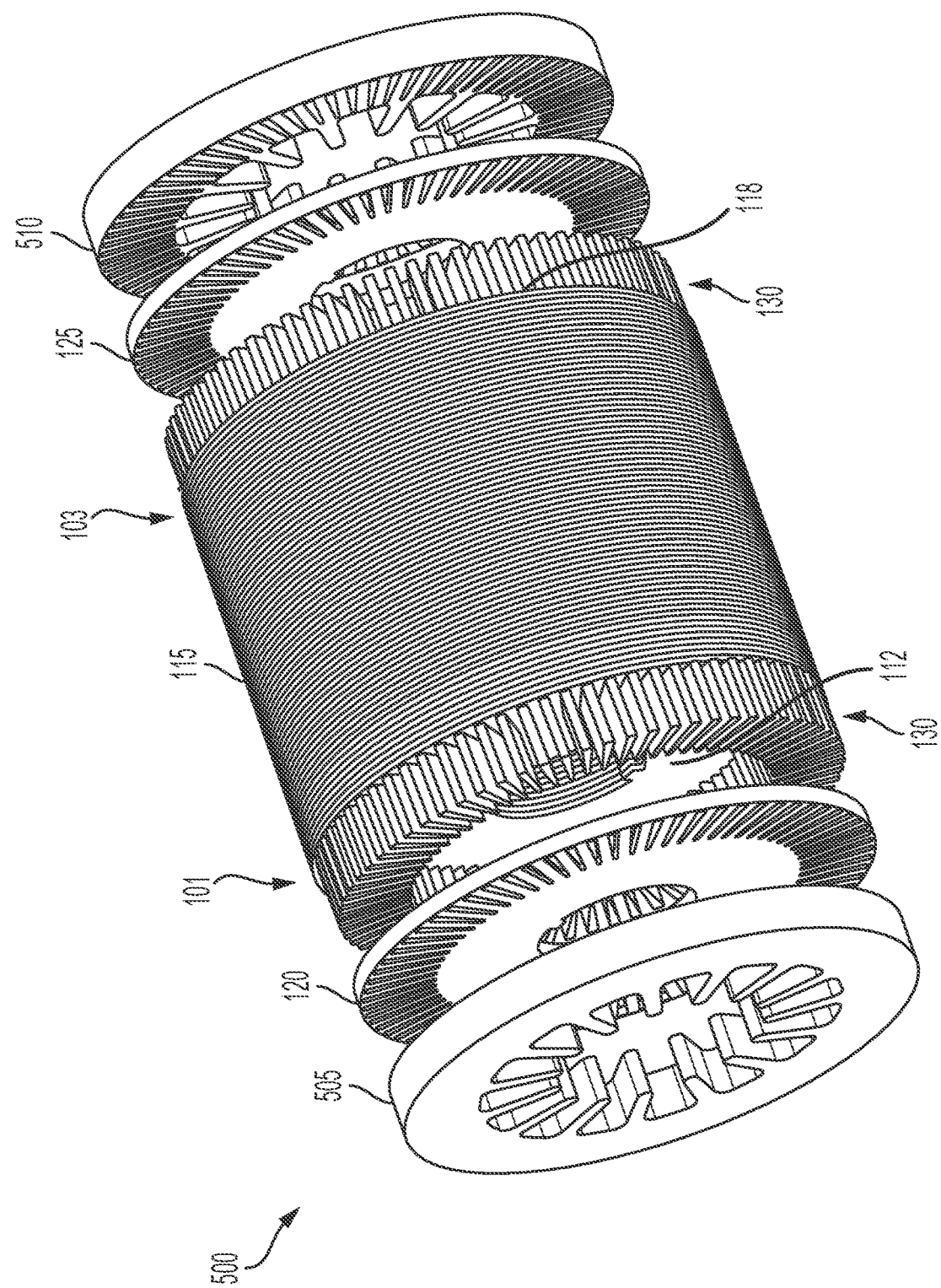
FIG. 6 depicts an exploded perspective, isometric view of an example centrifugally cast copper rotor assembly of an induction motor in an electric vehicle.

FIGS. 5 and 6, among others, respectively depict isometric and exploded isometric views of another example centrifugally cast copper rotor assembly 500. The centrifugally cast rotor assembly 500 can be part of an induction motor that provides the speed and torque required to drive an electric vehicle. The views of FIGS. 5 and 6 do not depict every component of the induction motor. For example, FIGS. 5 and 6 do not show the rotor shaft, the stator assembly, or the bearing assemblies of the induction motor. Referring to FIG. 6, among others, although the exploded view presents the components of the rotor assembly 500 as separable, after the centrifugal casting process has been completed, the components can be inseparable as described herein.

The rotor assembly 500 can include a first centrifugally cast copper end ring 505, the first intermediary ring 120, the rotor lamination stack 115, the second intermediary ring 125, and a second centrifugally cast copper end ring 510. Copper bars 130 can be inserted through slots disposed in the first intermediary ring 120, the rotor lamination stack 115, and the second intermediary ring 125. In contrast to the rotor assembly 100 depicted in FIGS. 1-4, each of the first end ring 505 and the second end ring 510 can include multiple cooling fin features designed to more efficiently transfer heat from the end rings 505 and 510 than the end rings 105 and 110 of rotor assembly 100.

Figure 8:
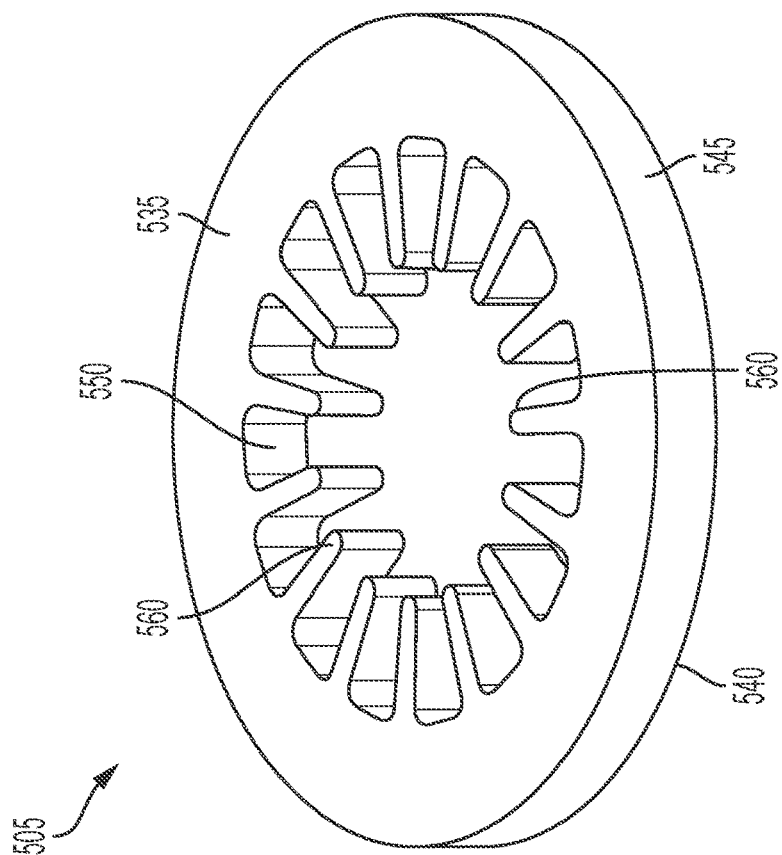
FIG. 8 depicts an isometric view of an example centrifugally cast copper end ring for a rotor assembly of an induction motor in an electric vehicle.
Figure 7:
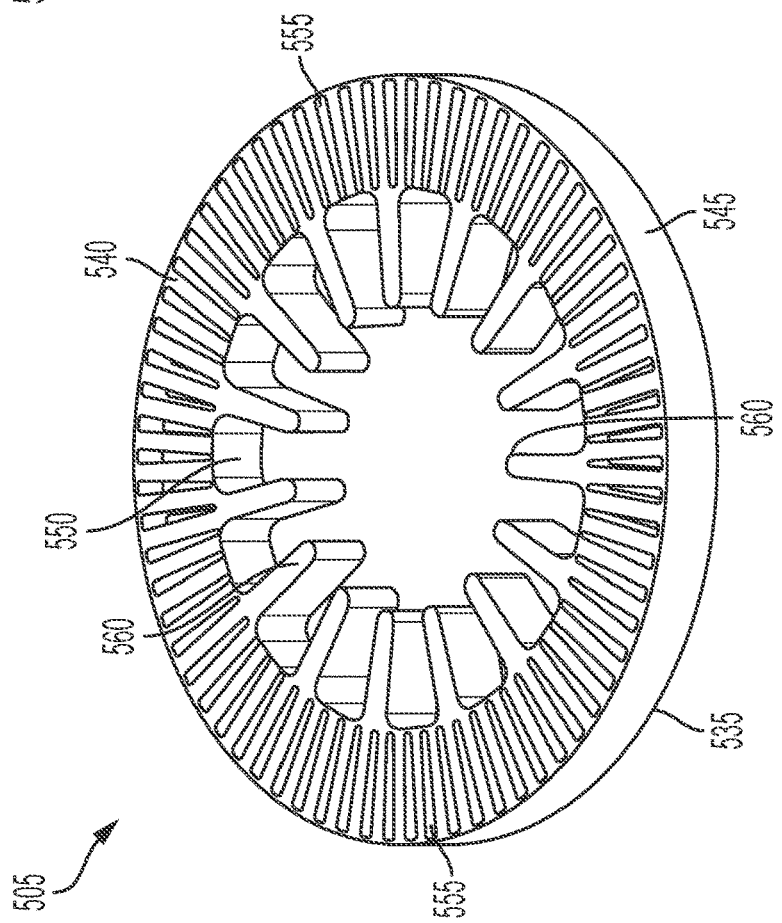
FIG. 7 depicts an isometric view of an example centrifugally cast copper end ring for a rotor assembly of an induction motor in an electric vehicle.

FIGS. 7 and 8, among others, depict isometric views of a first centrifugally cast copper end ring 505 for a rotor assembly 500 of an induction motor in an electric vehicle. Although FIGS. 7 and 8 specifically depict the first end ring 505, all of the description included below is equally applicable to the second end ring 510. It is also important to note that although FIGS. 6-8 depict end rings 505, 510 as separable from the copper bars 130 of the rotor assembly 500, after the centrifugal casting process has been completed, the end rings 505, 510 are inseparable from the copper bars 130.

The first centrifugally cast copper end ring 505 can be a ring-shaped structure with an exterior face 535, an interior face 540, an outer circumferential face 545, and an inner circumferential face 550. When included as part of the rotor assembly 500, the exterior face 535 can be oriented away from the rotor lamination stack 115, while the interior face 540 can be oriented towards the rotor lamination stack 115. The outer circumferential face 545 can have an outer diameter ranging from 120 mm to 300 mm, while the inner circumferential face 550 can have an inner diameter ranging from 60 mm to 260 mm.

The interior face 540 of the first end ring 505 can include multiple recesses 555 distributed about the interior face 540 near the outer circumferential face 545. The recesses 555 can be formed when cast copper flows and solidifies around the copper bars 130 during the centrifugal casting process. In addition to mechanically and electrically coupling with the copper bars 130, the interior face 540 of the first end ring 505 can contact an exterior surface of the first intermediary end ring 120.

The first centrifugally cast copper end ring 505 can also include multiple cooling fins 560 distributed about the inner circumferential face 550. Each of the cooling fins 560 can extend radially inward to the center of the ring 505, although the cooling fins 560 can be oriented in any suitable direction. The length the cooling fins 560 extend from the inner circumferential face 550 can range from 5 mm to 60 mm, and can be selected based on an amount of desired heat transfer from the end ring 505. In some instances, the cooling fins 560 have a rectangular shape with rounded edges, although any other suitable geometry can be utilized.

Figure 10:
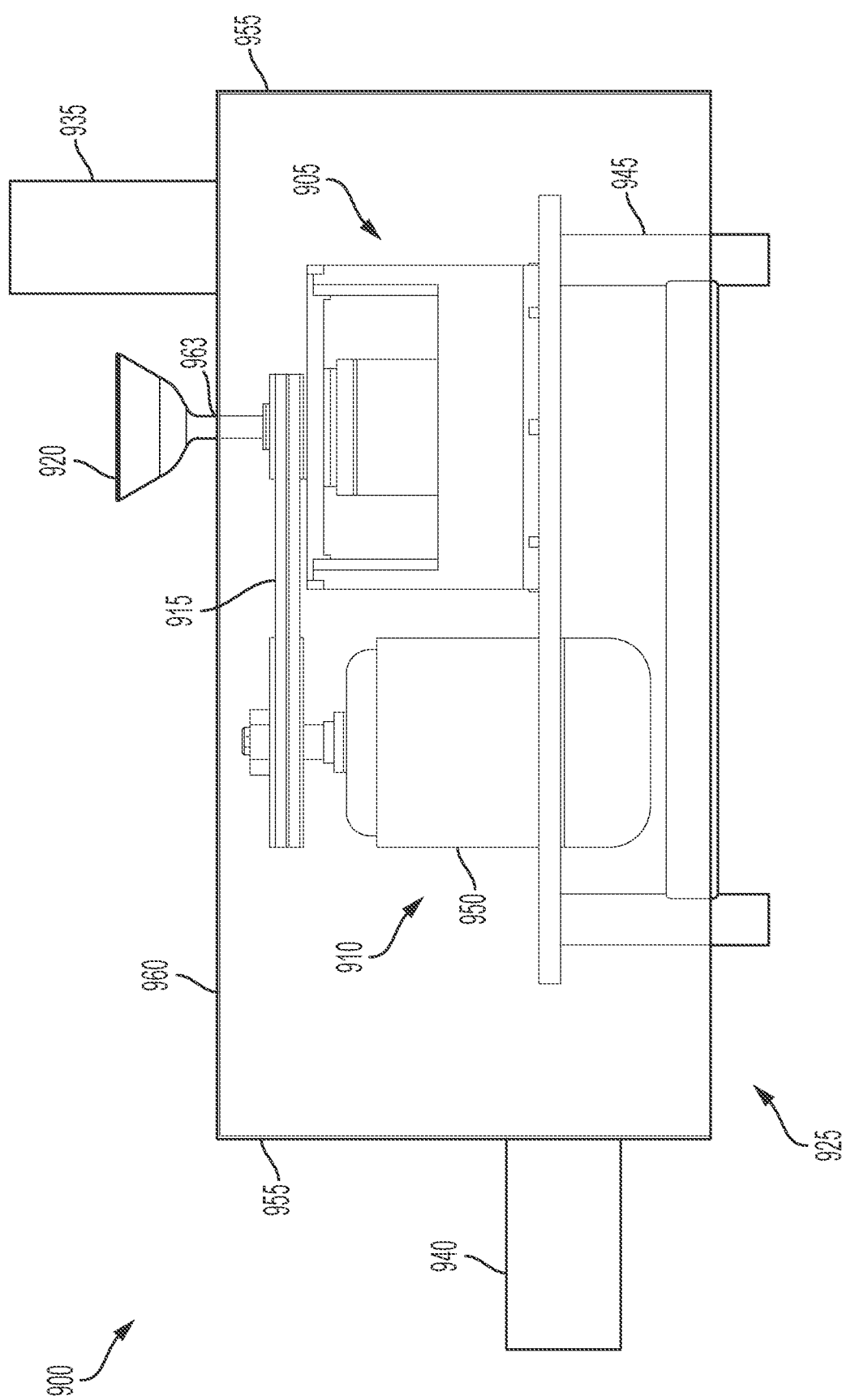
FIG. 10 depicts a side elevation view of an example centrifugal casting apparatus for a rotor assembly of an induction motor in an electric vehicle.

FIGS. 9 and 10, among others, respectively depict isometric and side views of a centrifugal casting apparatus 900. Preferably, the centrifugal casting apparatus 900 is used to fabricate the end rings of a rotor assembly in which the conductive bars and the end rings are constructed from pure copper or a copper-containing material, although this technique may also be used to fabricate rotor assemblies comprised of other materials (e.g., aluminum).

Centrifugal casting apparatus 900 can include a spinner assembly 905 and a driven motor assembly 910. The motor assembly 910 can be used to drive rotation of certain components of the spinner assembly 905 to supply the centrifugal force required to cast the copper and form the end rings. The drive torque provided by the motor assembly 910 can range from 50 N-m to 300 N-m depending on the size of the spinner assembly 905 and the rotor assembly to be casted. In an example instance, the motor assembly 910 can be coupled with the spinner assembly 905 using a drive belt 915. The drive belt 915 can be any suitable style of belt, including, but not limited to, a V-belt, a multi-groove belt, a ribbed belt, or a timing belt. In other instances, a chain, pulley, or gear drive system can be utilized to couple the spinner assembly 905 to the motor assembly 910. In some other instances, the spinner assembly 905 and the motor assembly 910 can be situated such that a direct drive connection is utilized to transfer a drive torque from the motor assembly 910 to the spinner assembly 905.

The spinner assembly 905 and the motor assembly 910 can be secured to a casting support structure 945. The casting support structure 945 can be a table-like apparatus with a substantially horizontal support component and multiple legs extending vertically from the horizontal support component. For example, the spinner assembly 905 can be secured (i.e., by mechanical fasteners, welding) to the horizontal support component. The horizontal support component can further include a recess configured to permit a portion of the motor assembly 910 to pass through the horizontal support component. In this way, the spinner assembly 905 and the motor assembly are aligned such that the drive belt 915 is substantially (i.e., ±10°) horizontal. In some instances, the spinner assembly 905 and the motor assembly 910 are disposed side-by-side. In some other instances, the spinner assembly 905 and the motor assembly 910 are disposed in any orientation relative to each other (i.e., the motor assembly 910 disposed above or below the spinner assembly 905) that permits the efficient transfer of drive torque from the motor assembly 910 to the spinner assembly 905.

Anti-oxidation shield 925 can at least partially encapsulate the spinner assembly 905, the motor assembly 910, and the casting support structure 945 during a centrifugal casting process. As used herein, "partially encapsulate" can refer to a majority of the volume occupied by each of the components 905, 910, 945 located within the anti-oxidation shield 925, without the creation of a hermetic seal. Anti-oxidation shield 925 can include a main body portion 930, an anti-oxidation gas inlet 935 and an anti-oxidation gas outlet 940. Each of the main body portion 930, the inlet 935, and the outlet 940 can be fabricated from a non-reactive high-temperature plastic material or sheet metal (e.g., aluminum, stainless steel). During the centrifugal casting process, molten copper can interact with atmospheric oxygen, resulting in an oxidation reaction. The rate of oxidation can increase with temperature. The oxidation reaction can cause an oxide skin to form on the surface of the molten copper during the melting process, which can become trapped in the bulk of the molten copper and transferred to the finished cast end rings. Inclusion of the oxide skin into the finished cast end rings can lead to defects and discontinuities that degrade the mechanical and electrical performance of the finished product.

The main body portion 930 of the anti-oxidation shield 925 can be used to direct and contain a gas with anti-oxidation properties in the area surrounding the spinner assembly 905, which can result in a reduction in the formation of an oxide skin in the molten copper used in the casting process. Specifically referring to FIG. 10, the main body portion 930 can include multiple sidewalls 955 coupled with a top wall 960 to form a box-like structure. In other instances, the main body portion 930 can have a different shape (e.g., a tube shape, a semi-circular shape). The top wall 960 can further include a sprue passage hole 963 to permit the passage of the sprue gate 920 through the anti-oxidation shield 925 so that molten copper can be supplied to the spinner assembly 905. The diameter of the sprue passage hole 963 can be selected to permit passage of the sprue gate 920 without permitting a significant volume of the anti-oxidation gas to escape from the main body portion 930.

The gas inlet 935 can be fluidly coupled (e.g., by a tube connection) to a source of anti-oxidizing gas, while the gas outlet 940 can be fluidly coupled with an exhaust system. The anti-oxidizing gas can be continuously flowing through the anti-oxidation shield 925 during the casting process. In some example instances, the anti-oxidation gas is pure nitrogen, or a nitrogen-containing mixture. In other example instances, the gas is either a pure gas or a mixture containing one of the following: argon, chlorine, Freon, or hexachloroethane.

Figure 11:
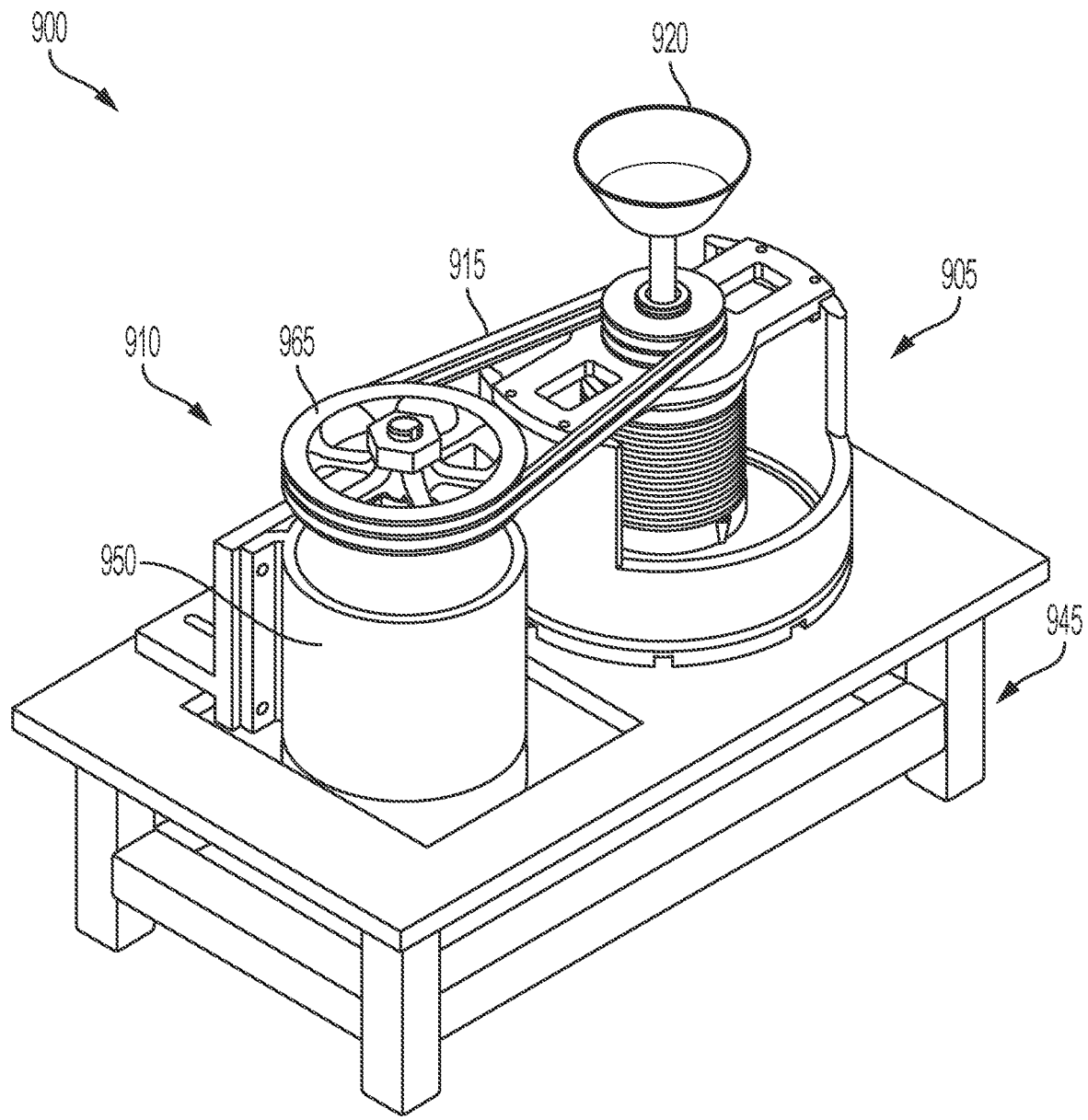
FIG. 11 depicts an isometric view of an example centrifugal casting apparatus for a rotor assembly of an induction motor in an electric vehicle.

FIG. 11, among others, depicts an isometric view of the centrifugal casting apparatus 900 with the anti-oxidation shield 925 removed from the apparatus. In an example instance, the centrifugal casting apparatus 900 can be utilized to complete a copper centrifugal casting process without the use of anti-oxidation shield 925. Motor assembly 910 can be secured to the casting support structure 945 through use of a motor support structure 950. In some instances, the motor support structure 950 includes a collar structure that wraps around the motor and is secured (e.g., by mechanical fasteners, welding) to an L-shaped structure. The L-shaped structure can be secured to the casting support structure 945 using any suitable method (e.g., mechanical fasteners, welding) to secure and maintain the motor in a position such that the drive belt 915 is substantially horizontal (i.e., parallel to the top surface of the casting support structure 945).

The motor assembly 910 can further include a drive wheel 965. The drive wheel 965 can be secured to a drive shaft of the motor (e.g., using a bolted connection) such that rotation of the drive shaft causes a corresponding rotation of the drive wheel 965. The outer diameter of the drive wheel 965 (i.e., the portion of the drive wheel 965 contacting the drive belt 915) can be selected, along with the drive speed of the motor, to achieve a targeted rotational speed of the spinner assembly. For example, the outer diameter of the drive wheel 965 can range from 200 mm to 500 mm. The height of the drive wheel 965 can similarly be selected to accommodate the height of the drive belt 915. For example, the height of the drive wheel 965 can range from 20 mm to 80 mm. The properties of the drive belt 915 (e.g., height, thickness, material) can be selected to withstand the torque provided by the motor assembly and the heat of the casting process. In other example instances, the centrifugal casting assembly 900 can include a chain or gear drive system. In these instances, the drive wheel 965 can alternatively be replaced by a sprocket component or a gear component.

Figure 12:
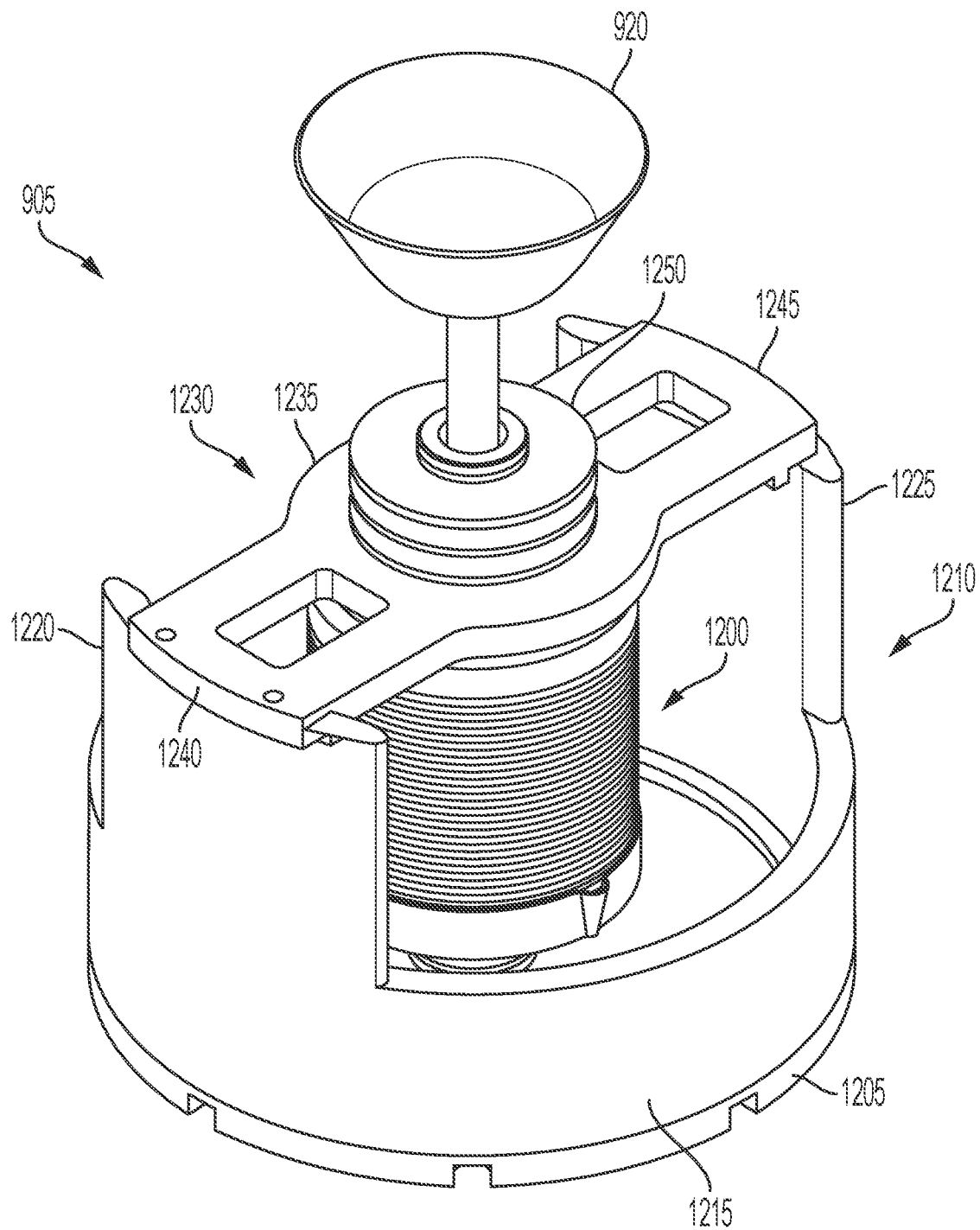
FIG. 12 depicts an isometric view of an example spinner assembly that can be used in a centrifugal casting apparatus for a rotor assembly of an induction motor in an electric vehicle.
Figure 13:
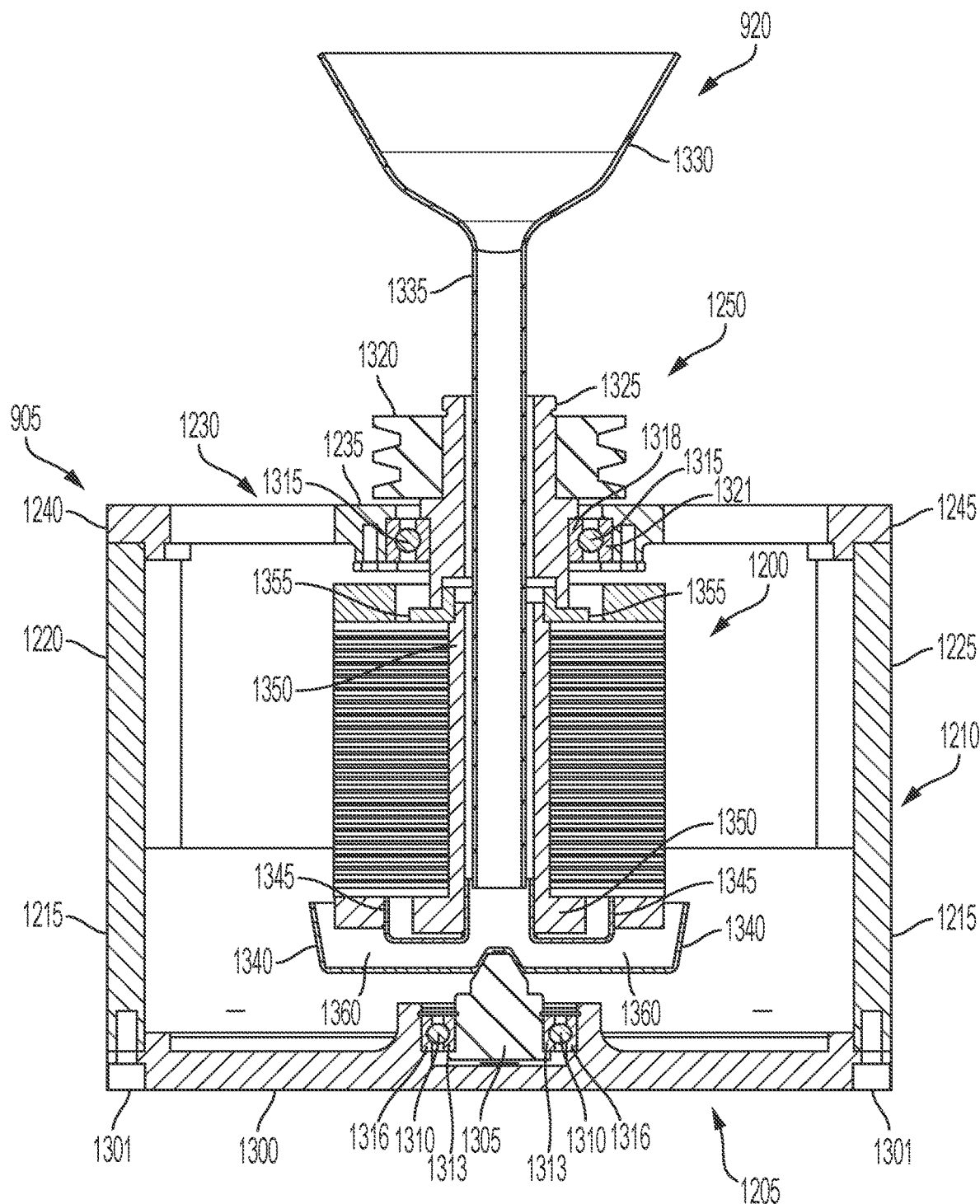
FIG. 13 depicts a side cross-sectional view of an example spinner assembly that can be used in a centrifugal casting apparatus for a rotor assembly of an induction motor in an electric vehicle.

FIGS. 12 and 13, among others, respectively depict isometric and side cross-sectional views of the spinner assembly 905. Spinner assembly 905 can include, among other components, a base plate assembly 1205, a sidewall structure 1210, an upper plate assembly 1230, and a drive wheel assembly 1250. Any or all of the components of the spinner assembly 905 can be fabricated from a material with good strength and heat-resistance properties (e.g., stainless steel).

Base plate assembly 1205 can include a base plate 1300, a spindle component 1305, and a bearing assembly 1310. Base plate 1300 can have a circular shape with multiple mounting holes 1301 distributed about the outer periphery of the base plate 1300. For example, mounting holes 1301 can be countersunk holes. Fasteners (e.g., bolts, pins) can pass through the mounting holes 1301 in order to couple the base plate assembly 1205 to the sidewall structure 1210. In some embodiments, the base plate assembly 1205 can be inseparably coupled with the sidewall structure 1210 using another method of joining components (e.g., welding, spot welding, brazing, metal gluing, riveting).

As shown specifically in FIG. 13, the thickness of base plate 1300 can be substantially uniform (i.e., ±5 mm) with thicker regions located at the outer periphery near the mounting holes 1301 and near the center surrounding the spindle component 1305 and the bearing assembly 1310. For example, the base plate 1300 can have a nominal thickness ranging from 20 mm to 100 mm, and a maximum thickness ranging from 100 mm to 300 mm in the region of the spindle component 1305.

The spindle component 1305 can be fabricated from stainless steel or any other suitable material as a solid component. The spindle component 1305 can include mating features (e.g., a cone-shaped protrusion) that permit the spindle component 1305 to mate with an outer die component (e.g., outer die component 1340) of the centrifugal casting apparatus 900 such that rotation of the outer die component causes a corresponding rotation to the spindle component 1305. The bearing assembly 1310 can be any type of mechanical bearing assembly (e.g., a ball bearing assembly, a roller bearing assembly) with an inner ring component 1313, an outer ring component 1316, and rolling components (e.g., balls) contained between the inner ring component 1313 and the outer ring component 1316. The outer ring component 1316 can be fixedly coupled with the base plate 1300, while the inner ring component 1313 can be fixedly coupled with the spindle component 1305 such that the inner ring component 1313 and the spindle component 1305 can rotate freely relative to the outer ring component 1316.

Referring again to FIG. 12, the sidewall structure 1210 can include a lower cylindrical portion 1215, a first upper portion 1220, and a second upper portion 1225. The lower cylindrical portion 1215 can be a ring-shaped structure. The height of the lower cylindrical portion 1215 can be selected such that the die components of the centrifugal casting assembly (e.g., the outer die component 1340 and the inner die component 1345) are located within the volume bounded by the lower cylindrical portion 1215 when a rotor assembly 1200 is installed in the spinner assembly 905. For example, the height of the lower cylindrical portion 1215 can range from 200 mm to 800 mm. The outer diameter of the lower cylindrical portion 1215 can be selected to permit sufficient clearance about the outer die component 1340. For example, the outer diameter of the lower cylindrical portion 1215 can range from 500 mm to 1200 mm. Each of the portions 1215, 1220, 1225 of the sidewall structure 1210 can be a uniform thickness. For example, the thickness of the sidewall structure 1210 can range from 15 mm to 50 mm.

The upper plate assembly 1230 can include a central ring portion 1235, a first arm portion 1240, and a second arm portion 1245. The central ring portion 1235 can be a ring-shaped member disposed beneath a portion of the drive wheel assembly 1250. First arm portion 1240 extends in a first direction away from the central ring portion 1235, while second arm portion 1245 extends from the central ring portion 1235 in a second direction. In an example instance, the first direction and the second direction are spaced opposite each other (i.e., 180° apart). Both the first arm portion 1240 and the second arm portion 1245 can include multiple holes to permit the passage of fasteners (e.g., bolts, pins, screws) to secure the first arm portion 1240 to the first upper portion 1220 and the second arm portion 1245 to the second upper portion 1225.

Each of the first arm portion 1240 and the second arm portion 1245 can include rectangular-shaped cutout regions. In other instances, the cutout regions can have any other desired shape (e.g., circle, square, oval). The cutout regions can reduce the weight of the upper plate assembly 1230. Reduction of the weight of the upper plate assembly 1230 can be desirable as the centrifugal casting process can include multiple steps of coupling and decoupling the upper plate assembly 1230 from the sidewall structure 1210 in order to position the rotor assembly 1200.

As shown specifically in FIG. 13, the thickness of the central ring portion 1235, the first arm portion 1240, and the second arm portion 1245 can be substantially uniform (i.e., ±5 mm) with thicker regions located at the outer periphery near the upper portions 1220, 1225 and near the center surrounding the bearing assembly 1315 and the drive wheel assembly 1250. For example, the central ring portion 1235, the first arm portion 1240, and the second arm portion 1245 can have a nominal thickness ranging from 15 mm to 30 mm. The central ring portion 1235 can have a maximum thickness ranging from 50 mm to 150 mm in the region of the bearing assembly 1315.

The bearing assembly 1315 can be any type of mechanical bearing assembly (e.g., a ball bearing assembly, a roller bearing assembly) with an inner ring component 1318, an outer ring component 1321, and rolling components (e.g., balls) contained between the inner ring component 1318 and the outer ring component 1321. The outer ring component 1321 can be fixedly coupled with the central ring portion 1235, while the inner ring component 1318 can be fixedly coupled with an inner drive wheel component 1325 of the drive wheel assembly 1250 such that the inner ring component 1318 of the bearing assembly 1315, the inner drive wheel component 1325 of the drive wheel assembly 1250, and the outer drive wheel component 1320 of the drive wheel assembly 1250 can rotate freely relative to the outer ring component 1321 of the bearing assembly 1315.

The outer drive wheel component 1320 can be a ring-shaped member with multiple teeth or grooves running either continuously or non-continuously on an exterior circumferential surface of the member. The geometry of the teeth or grooves (e.g., number of teeth or grooves, depth, width) can be selected to accommodate the properties of the drive belt 915. For example, the drive belt 915 can include two or more grooves that mesh with the teeth of the outer drive wheel component 1320 such that power from the drive belt 915 is transmitted to the outer drive wheel component 1320, resulting in the rotation of the outer drive wheel component 1320. Similarly, the height of the outer drive wheel component 1320 can be selected to accommodate the height of the drive belt 915. For example, the height of the outer drive wheel component 1320 can range from 20 mm to 80 mm. In other example instances, the centrifugal casting apparatus 900 can include a chain or gear drive, and a sprocket component or a gear component can be used in place of the outer drive wheel component 1320.

The inner drive wheel component 1325 can be coupled with the outer drive wheel component 1320 such that rotation of the outer drive wheel component 1320 due to power transmission from the drive belt 915 also results in rotation of the inner drive wheel component 1325. For example, the outer drive wheel component 1320 and the inner drive wheel component 1325 can be inseparably coupled using an interference or press fit assembly method such that friction between an inner circumferential surface of the outer drive wheel component 1320 and an outer circumferential surface of the inner drive wheel component 1325 retains the components of the drive wheel assembly 1250 in an assembled configuration. In other instances, the inner drive wheel component 1325 and the outer drive wheel component 1320 can be assembled using another suitable method.

The inner drive wheel component 1325 can be a ring-shaped member with a generally constant (i.e., having a constant inner diameter for greater than 75% of the length of the member) inner diameter sizing and a generally variable outer diameter sizing (i.e., having a constant outer diameter for less than 75% of the length of the member). In addition to being fixedly coupled with the outer drive wheel component 1320, the inner drive wheel component 1325 can be fixedly coupled with the inner ring component of the bearing assembly 1315 and detachably coupled with a lock nut 1355 that is used to secure a hollow shaft 1350 to the rotor assembly 1200. For example, an inner circumferential surface of the inner drive wheel component 1325 can mate (e.g., using a friction fit) with an outer circumferential surface of the lock nut 1355, such that rotation of the inner drive wheel component 1325 is transferred through the lock nut 1355 to cause rotation of the rotor assembly 1200. In other instances, another mechanical locking structure is used to cause rotation of the rotor assembly 1200 is place of the lock nut 1355.

Still referring to FIG. 13, the sprue gate 920 can be inserted through the inner drive wheel component 1325 and the hollow shaft 1350 in order to deposit molten copper in a region 1360 between an outer die component 1340 and an inner die component 1345 of the rotor assembly 1200. Inner die 1345 can be retained in its casting position by the hollow shaft 1350, while outer die component 1340 can be retained in its casting position by the spindle component 1305. In some examples presented herein, the sprue gate 920 can be inserted through a gate hole 963 disposed in the top wall 960 of the anti-oxidation shield 925. Sprue gate 920 can include a funnel portion 1330 and a neck portion 1335. For example, funnel portion 1330 can have a frustoconical shape with a triangular cross-section. In other embodiments, funnel portion 1330 can have any geometry required to introduce molten copper into the die components 1340, 1345 at a desired flow rate. For example, funnel portion 1330 can have a semispherical shape with a semicircular cross-section. In some example instances, the funnel portion 1330 can include a filter or filtration media, such that the molten copper passes through the filter and filtration media to reduce the amount of non-metallic particles in the molten copper.

The neck portion 1335 can extend from the funnel portion 1330 such that funnel portion 1330 and neck portion 1335 share an uninterrupted wall. The length and diameter of the neck portion 1335 can depend on the dimensions of the rotor assembly 1200. For example, the outer diameter of the neck portion 1335 may range from 10 mm to 50 mm, while the length of the neck portion 1335 may range from 150 mm to 600 mm. The sprue gate 920 can be retained in its casting position by thermally resistive tongs or any other suitable mechanical structure.

Figure 14:
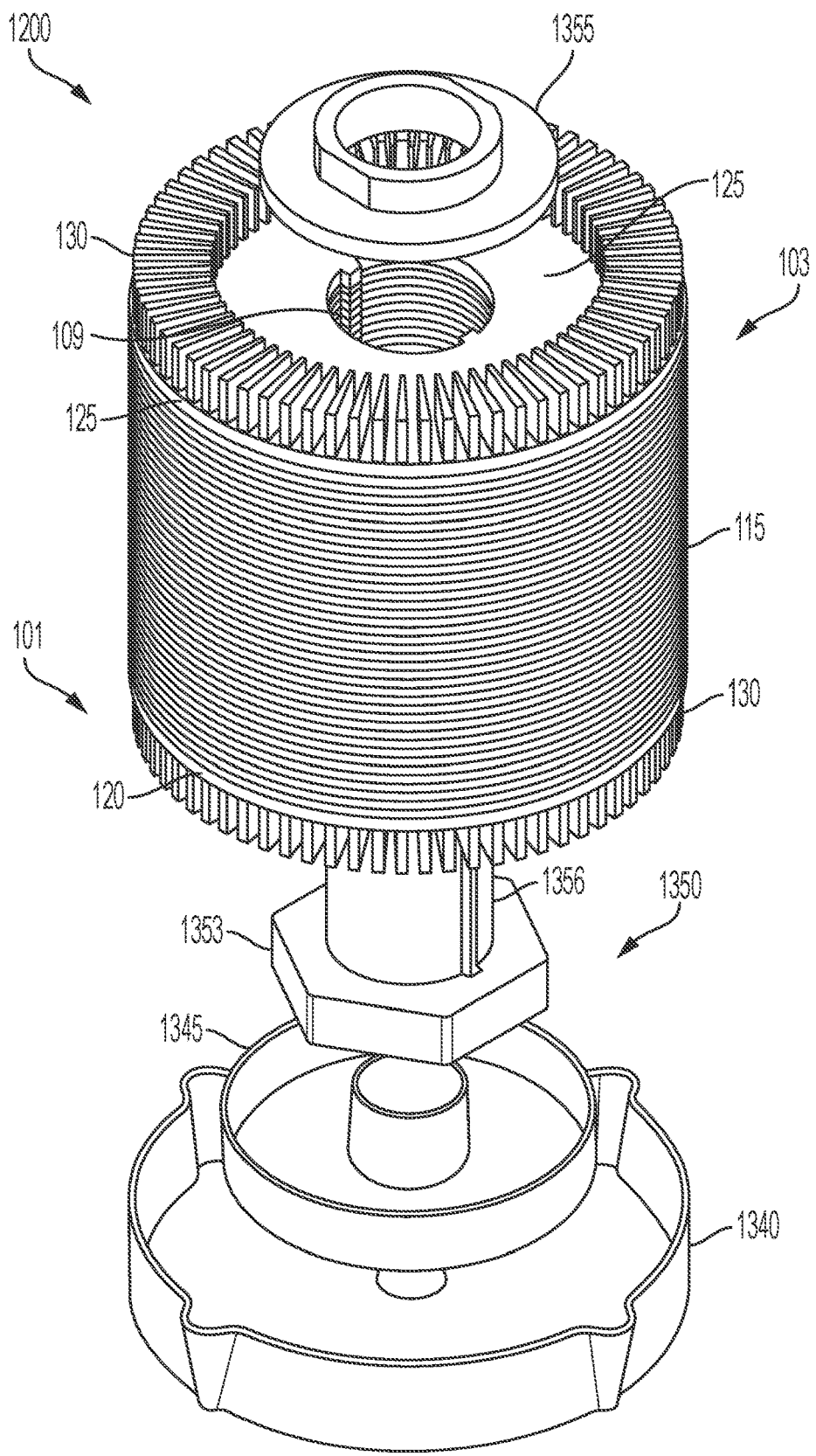
FIG. 14 depicts an exploded isometric view of an example rotor assembly of an induction motor in an electric vehicle.
Figure 15:
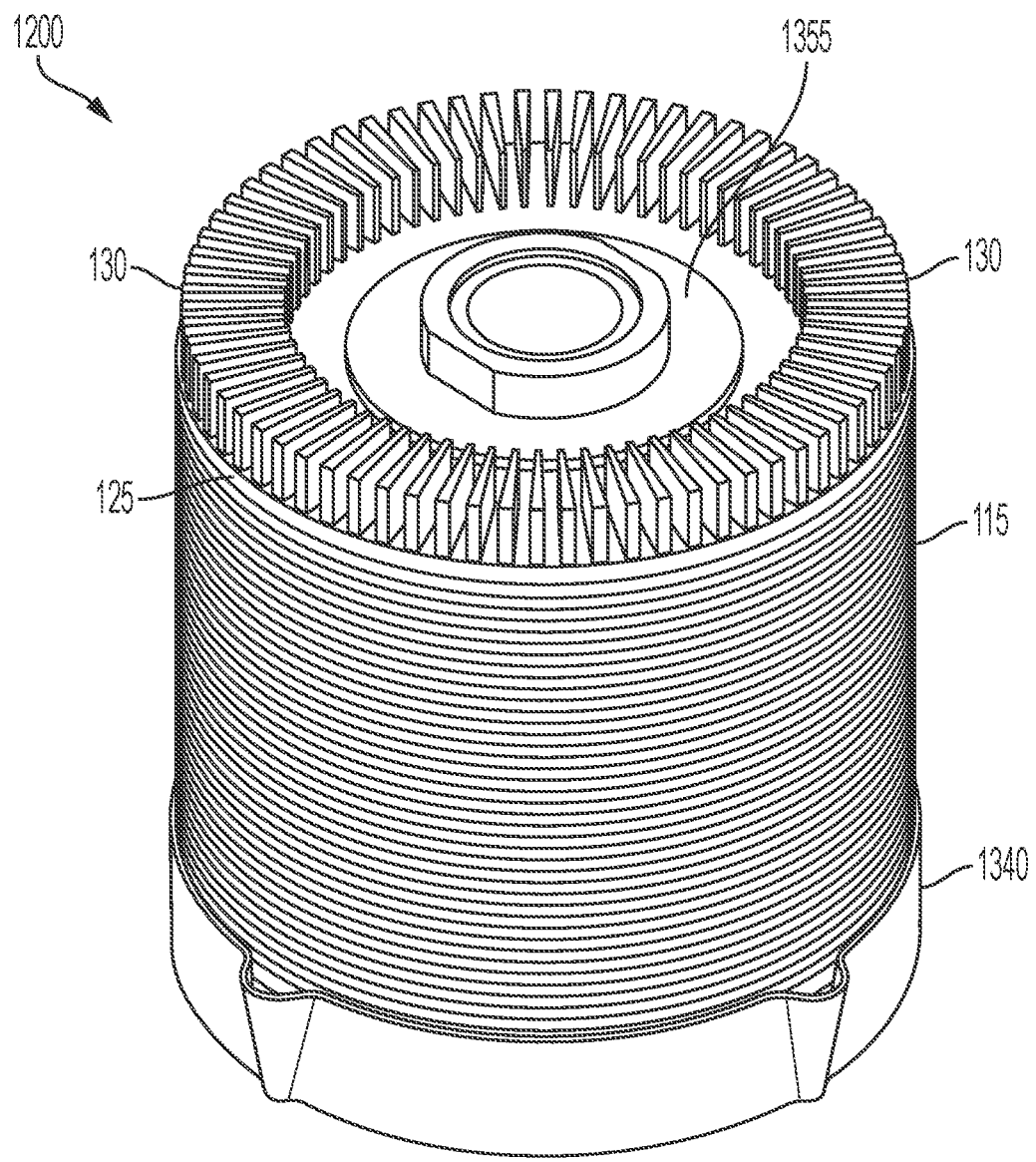
FIG. 15 depicts an isometric view of an example rotor assembly of an induction motor in an electric vehicle.

FIGS. 14 and 15, among others, respectively depict exploded isometric and isometric views of the rotor assembly 1200. Rotor assembly 1200 can be installed within the centrifugal casting apparatus 900 during a centrifugal casting process. Rotor assembly 100 or rotor assembly 500, described above with reference to FIGS. 1-8, can be the result at the completion of the centrifugal casting process. Rotor assembly 1200 can include the rotor lamination stack 115, the first intermediary end ring 120, the second intermediary end ring 125. Copper bars 130 can be inserted through the rotor slots located in the rotor lamination stack 115, the first intermediary end ring 120, and the second intermediary end ring 125 prior to the casting process.

The rotor assembly 1200 can further include a hollow shaft 1350 and a lock nut 1355. The hollow shaft 1350 can include a shaft portion 1356 and a flange portion 1353. The shaft portion 1356 can be inserted through the central bore 109 of the rotor lamination stack 115. In some example instances, the shaft portion 1356 has an outer diameter ranging from 50 mm to 150 mm and an inner diameter ranging from 20 mm to 120 mm. The inner diameter of the shaft portion 1356 can be sized to permit the sprue gate 920 to pass easily through the shaft portion 1356. For example, a clearance region ranging from 2 mm to 10 mm can be maintained between the sprue gate 920 and the shaft portion 1356

The hollow shaft 1350 can be secured by threadably coupling the lock nut 1355 to the shaft portion 1356. For example, the lock nut 1355 can be a flange nut that is secured flush against an exterior surface of the second intermediary end ring 125. In other example instances, the lock nut 1355 can be any suitable type of nut, including, but not limited to, a hex nut, a wing nut, a square nut, or a cap nut. In still further instances, a washer, spacer, or other hardware can be arranged between the second intermediary end ring 125 and the lock nut 1355.

The flange portion 1353 can have a hexagonal shape and can be arranged between the first intermediary end ring 120 and the inner die component 1345. In an example instance, the flange portion 1353 can be installed flush against the intermediary end ring 120, while a clearance region ranging from 1 mm to 10 mm is maintained between the flange portion 1353 and the inner die component 1345. In other example instances, the flange portion 1353 can be installed flush against the inner die component 1345 while a clearance region is maintained between the flange portion 1353 and the intermediary end ring 120.

The rotor assembly 1200 can further include an inner die component 1345 and an outer die component 1340. The inner die component 1345 can be spaced apart from the outer die component 1340. During the centrifugal casting process, molten copper can be directed to a region (i.e., region 1360, depicted in FIG. 13) between the inner die component 1345 and the outer die component 1340. The shape of the casted end rings (e.g., end rings 105, 110, 505, 510) can be determined by the geometry of the region between the inner die component 1345 and the outer die component 1340. In some example instances, the inner die component 1345 can be retained on inner circumferential surfaces of the copper bars 130 using a friction fit. The outer die component 1340 can be retained on outer circumferential surfaces of the rotor lamination stack 115 using a friction fit.

Figure 16:
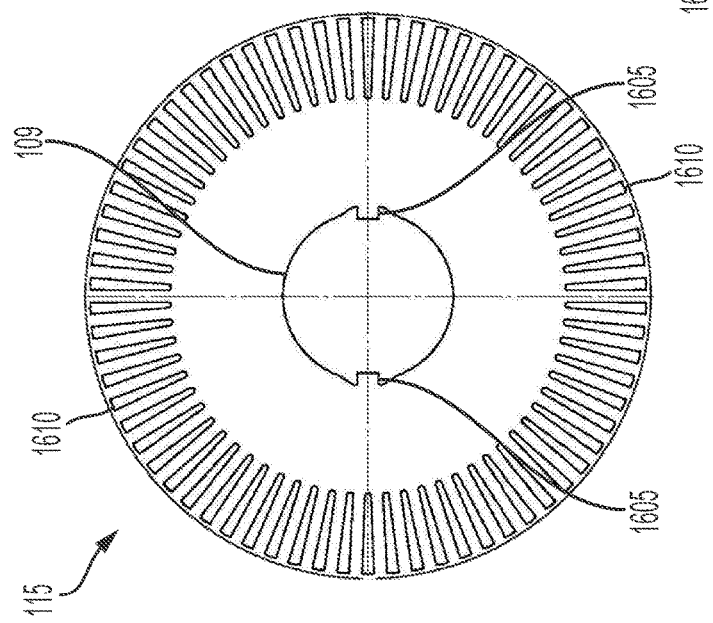
FIG. 16 depicts a top elevation view of an example lamination stack assembly used in a rotor assembly of an induction motor in an electric vehicle.

FIG. 16, among others, depicts a top elevation view of the rotor lamination stack 115. Each lamination disc can include bore 109 stamped or otherwise formed at the center of each disc. In some example instances, the bore 109 can have a substantially circular cross-section with notch features 1605. A "substantially circular cross-section" can refer to a cross-section in which at least 75% of the perimeter of the bore 109 conforms to a circular geometry. In other example instances, the bore 109 can have any other suitable geometry, including, but not limited to, a square, rectangular, or triangular cross-section. Notch features 1605 can be utilized in the alignment of each lamination disc relative to each other, and in the alignment of a shaft passing through the bore 109. For example, the shaft can include recess features that receive the notch features 1605 to prevent rotation of the shaft relative to the rotor lamination stack 115. Although FIG. 16 depicts the bore 109 as having two rectangular notch features 1605 spaced 180° apart, any number of notch features with any geometry and orientation can be utilized.

Figure 17:
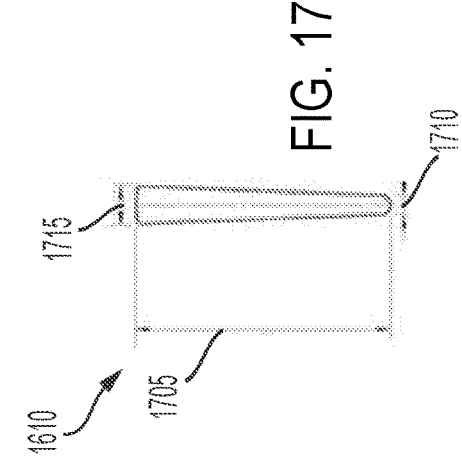
FIG. 17 depicts a detail elevation view of an example lamination stack rotor slot used in a rotor assembly of an induction motor in an electric vehicle.

Each lamination disc of the rotor lamination stack 115 can further include multiple rotor slots 1610 distributed evenly about the circumference of each disc. For example, each lamination disc can include a number of slots ranging from 32 to 100 slots. FIG. 17, among others, depicts a detail view of a rotor slot 1610 of the rotor lamination stack 115. Each rotor slot 1610 can have a tapered shape with a first end that is narrower than a second end. The first end of slot 1610 can be located closer to the central bore 109 than the second end. In some example instances, the height 1705 of the slot 1610 can range from 18 mm to 22 mm, the first end width 1710 of the slot 1610 can range from 1.0 mm to 2.5 mm, and the second end width 1715 of the slot 1610 can range from 2 mm to 5 mm. In other example instances, the dimensions of the rotor slot 1610 can be larger or smaller to accommodate copper bars (i.e., copper bars 130) having correspondingly larger or smaller dimensions.

Figure 18:
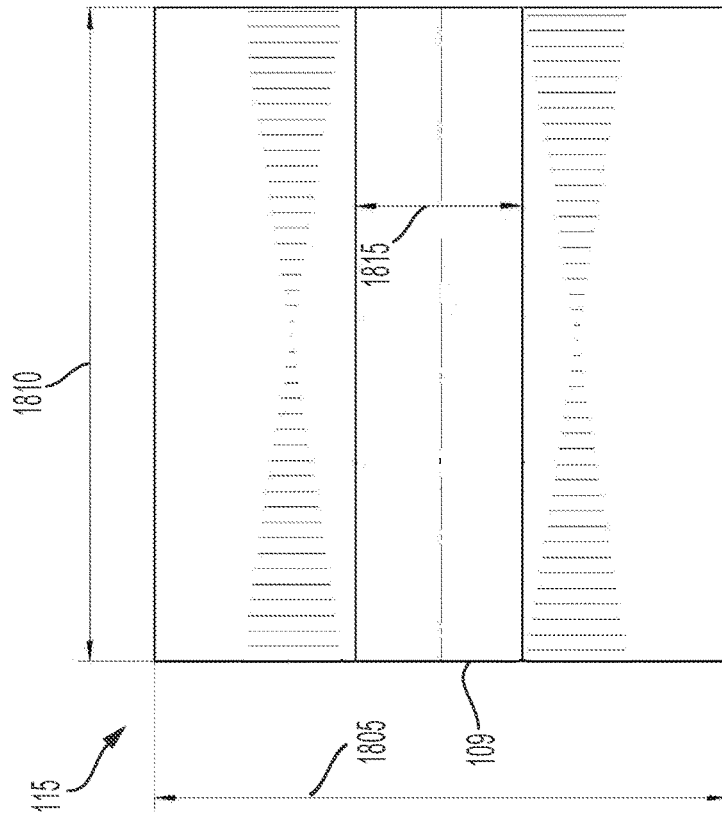
FIG. 18 depicts a side cross-sectional view of an example lamination stack assembly used in a rotor assembly of an induction motor in an electric vehicle.

FIG. 18, among others, depicts a side cross-sectional view of the rotor lamination stack 115. In some example instances, the outer diameter 1805 of the rotor lamination stack 115 (i.e., the outer diameter of each individual lamination disc) can range from 132 mm to 155 mm. The height 1810 of the rotor lamination stack 115 can range from 100 mm to 155 mm. The diameter 1815 of the central bore 109 can range from 40 mm to 50 mm. In other example instances, any or all of the outer diameter 1805, the height 1810, and the diameter 1815 can be larger or smaller depending on the specifications of the induction motor in which the rotor lamination stack 115 is installed.

Figure 20:
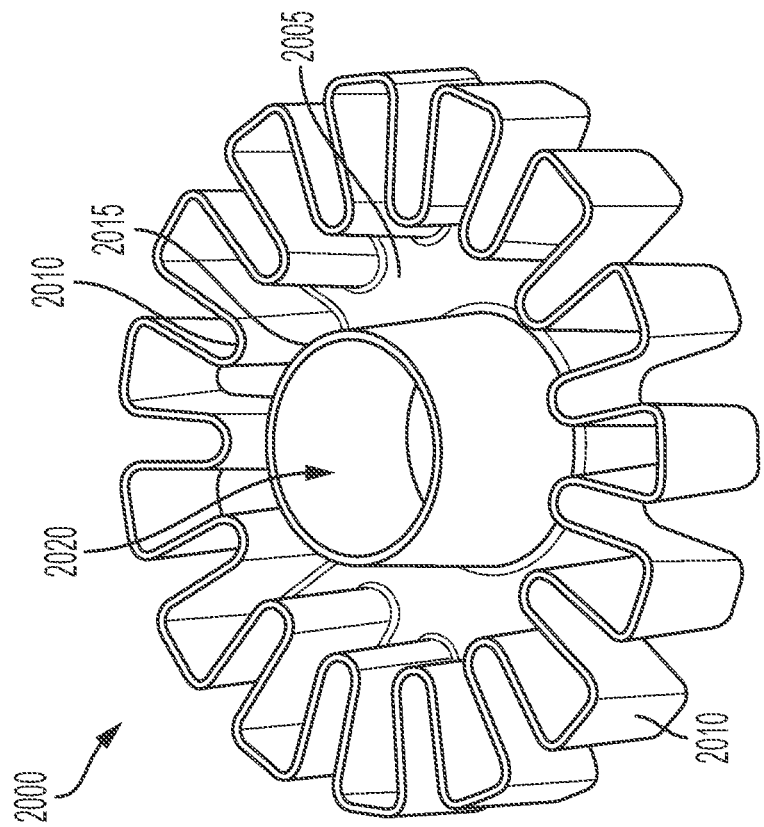
FIG. 20 depicts an isometric view of an example inner die component used in a centrifugal casting apparatus for a rotor assembly of an induction motor in an electric vehicle.
Figure 19:
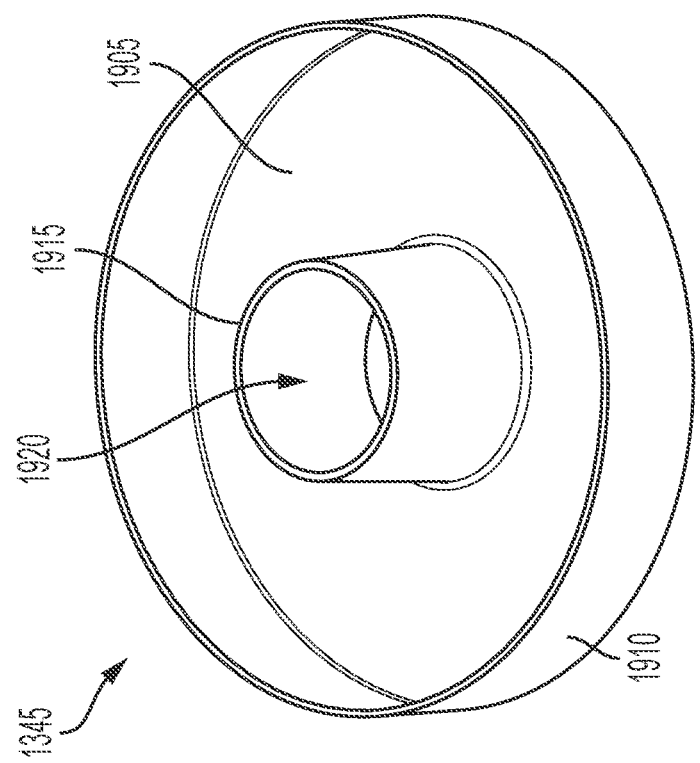
FIG. 19 depicts an isometric view of an example inner die component used in a centrifugal casting apparatus for a rotor assembly of an induction motor in an electric vehicle.

FIGS. 19 and 20, among others, depict isometric views of example inner die components 1345 and 2000. Either inner die component 1345 or 2000 can be nested inside an outer die component in the rotor assembly 1200 during the centrifugal casting process (e.g., as shown in FIG. 14). In various example embodiments, the inner die components 1345, 2000 can be fabricated from a high temperature-resistant ceramic material or a metal (e.g., stainless steel). Specifically referring to FIG. 19, an inner die component 1345 is depicted. Inner die component 1345 can include a base plate 1905, an outer circumferential wall 1910, and an inner circumferential wall 1915. In some example presented herein, the base plate 1905 can have a ring shape. For example, the base plate 1905 can have an outer diameter (i.e., the diameter at the intersection between the base plate 1905 and the outer circumferential wall 1910) ranging from 100 mm to 300 mm, and an inner diameter (i.e., the diameter at the intersection between the base plate 1905 and the inner circumferential wall 1915) ranging from 15 mm to 60 mm.

The outer circumferential wall 1910 can extend vertically from the base plate 1905 and can have a ring-shaped structure. For example, the outer circumferential wall 1910 can have a height above the base plate 1905 ranging from 10 mm to 60 mm. In some examples presented herein, the outer circumferential wall 1910 is substantially perpendicular (i.e., ±10°) to the base plate 1905. In other examples presented herein, the outer circumferential wall 1910 can be situated at a draft angle of 15° or more relative to the base plate 1905. Inner circumferential wall 1915 can extend vertically from the base plate 1905 and can have a ring-shaped structure that surrounds a central bore 1920. For example, the inner circumferential wall 1915 can have a height above the base plate 1905 ranging from 10 mm to 60 mm. In some examples presented herein, the inner circumferential wall 1915 is substantially perpendicular (i.e., ±10°) to the base plate 1905. In other examples presented herein, the inner circumferential wall 1915 can be situated at a draft angle of 15° or more relative to the base plate 1905.

Referring now to FIG. 20, an inner die component 2000 is depicted. The inner die component 2000 can be used in the place of inner die component 1345 when the casted rotor assembly requires the additional cooling afforded by cooling fins. For example, the inner die component 2000 can be used to fabricate the first end ring 505 and the second end ring 510 containing cooling fins described and depicted above with reference to FIGS. 5-8. The inner die component 2000 can include a base plate 2005, an outer circumferential wall 2010, and an inner circumferential wall 2015. In some examples presented herein, the base plate 2005 can have a ring shape with a convoluted (i.e., back and forth) outer perimeter geometry. For example, the base plate 2005 can have a minimum outer diameter (i.e., the innermost point at which the base plate 2005 intersects the outer circumferential wall 2010) ranging from, 100 mm to 200 mm, and a maximum outer diameter (i.e., the outermost point at which the base plate 2005 intersects the outer circumferential wall 2010) ranging from 200 mm to 300 mm. The base plate 2005 can further have an inner diameter (i.e., the diameter at the intersection between the base plate 2005 and the inner circumferential wall 2015) ranging from 10 mm to 60 mm.

The outer circumferential wall 2010 can extend vertically from the base plate 2005 and can have a convoluted ring-shaped structure. The geometry of the convolutions (e.g., depth, width) can include any dimensions required to produce a desired surface area and number of casted cooling fins. The outer circumferential wall 2010 can have a height above the base plate 2005 ranging from 15 mm to 50 mm. In some examples presented herein, the outer circumferential wall 2010 is substantially perpendicular (i.e., ±10°) to the base plate 2005. In other examples presented herein, the outer circumferential wall 2010 can be situated at a draft angle of 15° or more relative to the base plate 2005. The inner circumferential wall 2015 can extend vertically from the base plate 2005 and can have a ring-shaped structure that surrounds a central bore 2020. In some example instances, the geometric characteristics of the inner circumferential wall 2015 (i.e., height, angle relative to the base plate 2005) are identical or substantially similar (i.e., ±10%) to the geometric characteristics of the inner circumferential wall 1915 described above with respect to FIG. 19.

Figure 22:
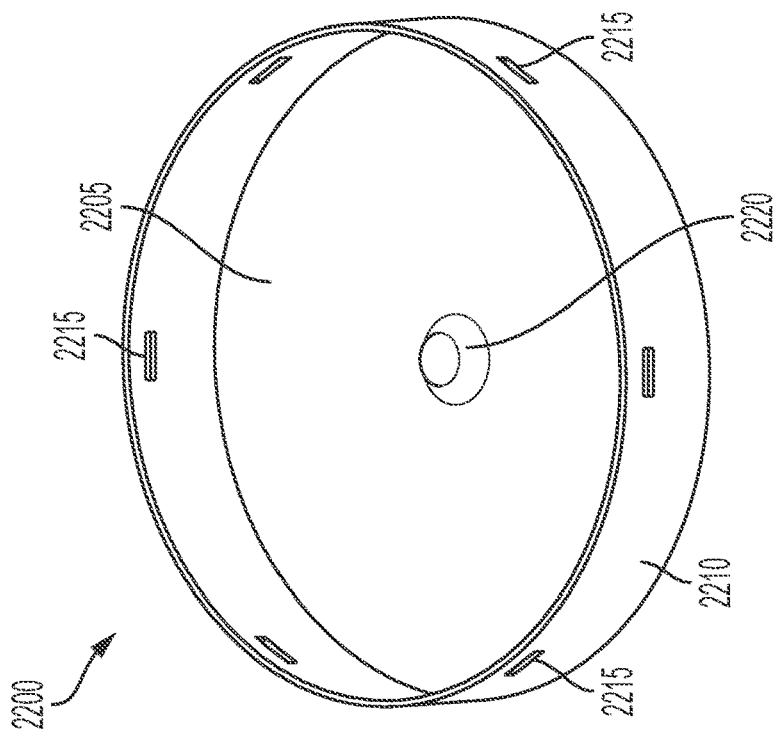
FIG. 22 depicts an isometric view of an example outer die component used in a centrifugal casting apparatus for a rotor assembly of an induction motor in an electric vehicle.
Figure 21:
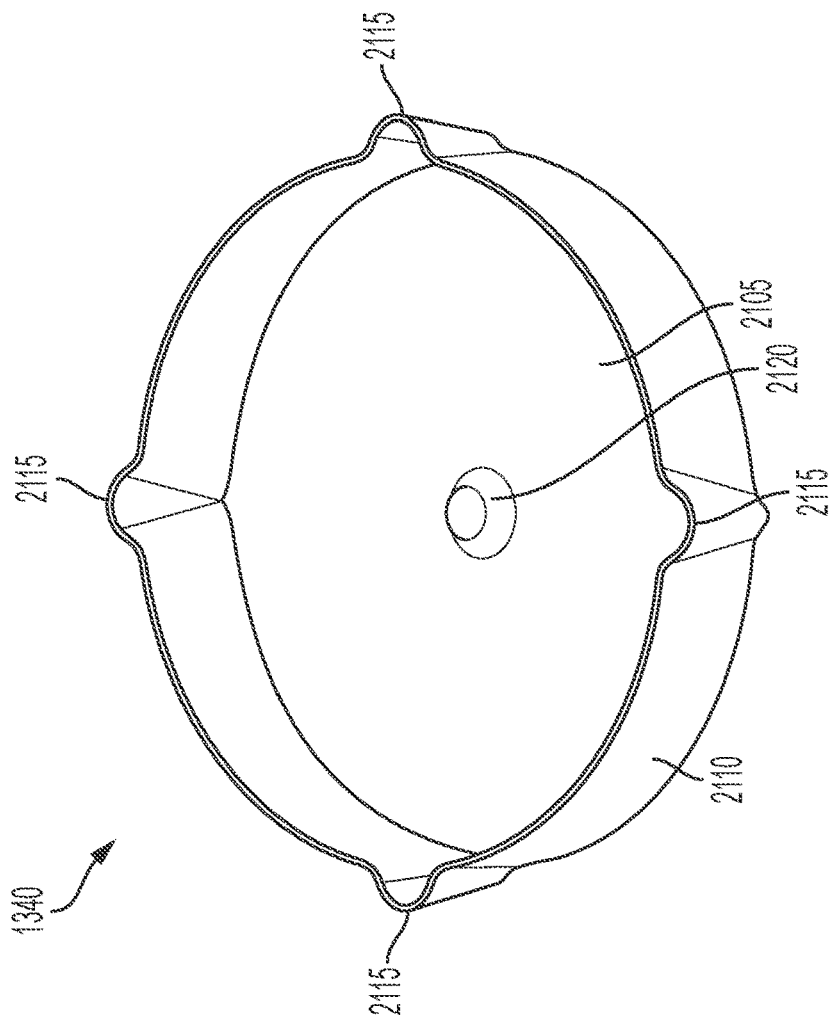
FIG. 21 depicts an isometric view of an example outer die component used in a centrifugal casting apparatus for a rotor assembly of an induction motor in an electric vehicle.

FIGS. 21 and 22, among others, depict isometric views of example outer die components 1340 and 2200. Either outer die component 1340 or 2200 can be nested outside an inner die component in the rotor assembly 1200 during the centrifugal casting process (e.g., as shown in FIG. 14). In various example embodiments, the outer die components 1340, 2200 can be fabricated from a high temperature-resistant ceramic material or a metal (e.g., stainless steel). Specifically referring to FIG. 21, an outer die component 1340 is depicted. The outer die component 1340 can include a base plate 2105, an outer circumferential wall 2110, and a central projection 2120. In some examples presented herein, the base plate 2105 can have a circular shape. For example, base plate 2105 can have an outer diameter (i.e., the diameter at the intersection between the base plate 2105 and the outer circumferential wall 2110) ranging from 100 mm to 300 mm. In other examples presented herein, base plate 2105 can have a square shape, a rectangular shape, or any other desired shape. The outer circumferential wall 2110 can extend vertically from the base plate 2105. For example, the outer circumferential wall 2110 can have a height ranging from 10 mm to 60 mm above the base plate 2105. In some examples presented herein, the outer circumferential wall 2110 is substantially perpendicular (i.e., ±10°) to the base plate 2105. In other examples presented herein, the outer circumferential wall 2110 can be situated at a draft angle of 15° or more relative to the base plate 2105.

The outer circumferential wall 2110 can include multiple outgassing ports 2115 distributed about the perimeter of the outer circumferential wall 2110. The outgassing ports 2115 can be formed as flared discontinuities in the outer circumferential wall 2110. For example, the outer circumferential wall 2110 can be cylindrical (i.e., having a circular cross-section) except in the region of the outgassing ports 2115. The outgassing ports 2115 can be used to determine when the centrifugal casting process is completed. For example, a technician can stop pouring molten copper through the sprue gate 920 as soon as the copper has flowed to the outer circumferential wall 2110 and is visible from the outgassing ports 2115. In some example instances, the outer die component 1340 can include four outgassing ports 2115 distributed at 90° intervals about the outer circumferential wall 2110. In other instances, the outer die component 1340 can include any number of outgassing ports 2115, having any geometry about the outer circumferential wall 2110.

The central projection 2120 can form a continuous surface with the base plate 2105. For example, the central projection 2120 can be cone-shaped with a height above the base plate 2105 ranging from 10 mm to 60 mm. The geometry of the central projection 2120 can permit the outer die component 1340 to mate with the spindle component 1305 of the base plate assembly 1205 when the rotor assembly 1200 is mounted in the spinner assembly 905. In other example instances, the central projection 2120 can be any other shape required to permit the outer die component 1340 to mate with the spindle component 1305 of the base plate assembly 1205.

Turning now to FIG. 22, an outer die component 2200 is depicted. The outer die component 2200 can include a base plate 2205, an outer circumferential wall 2210, and a central projection 2220. In some examples presented herein, the base plate 2205 can have a circular shape. For example, base plate 2205 can have an outer diameter (i.e., the diameter at the intersection between the base plate 2205 and the outer circumferential wall 2210) ranging from 100 mm to 300 mm. In other examples presented herein, base plate 2205 can have a square shape, a rectangular shape, or any other desired shape. The outer circumferential wall 2210 can extend vertically from the base plate 2205. For example, the outer circumferential wall 2210 can have a height ranging from 10 mm to 60 mm above the base plate 2205. In some examples presented herein, the outer circumferential wall 2210 is substantially perpendicular (i.e., ±10°) to the base plate 2205. In other examples presented herein, the outer circumferential wall 2210 can be situated at a draft angle of 15° or more relative to the base plate 2205.

The outer circumferential wall 2210 can include multiple retention slots 2215. The retention slots 2215 can be utilized to permit the escape of air and gas during the casting process. In some examples presented herein, the width of each slot 2215 can range from 2 mm to 3 mm, and the height of each slot 2215 can range from 1 mm to 2 mm. Although FIG. 22 depicts the outer die component 2200 as having six retention slots 2215 evenly distributed about the outer circumferential wall 2210, in other example instances, the outer die component 2200 can include any number of retention slots 2215, situated in any orientation on the outer circumferential wall 2210. The outer die component 2200 is further shown to include a central projection 2220. In some example instances, the geometric characteristics of the central projection 2220 (i.e., height) are identical or substantially similar (i.e., ±10%) to the geometric characteristics of the central projection 2120 described above with respect to FIG. 21.

Figure 23:
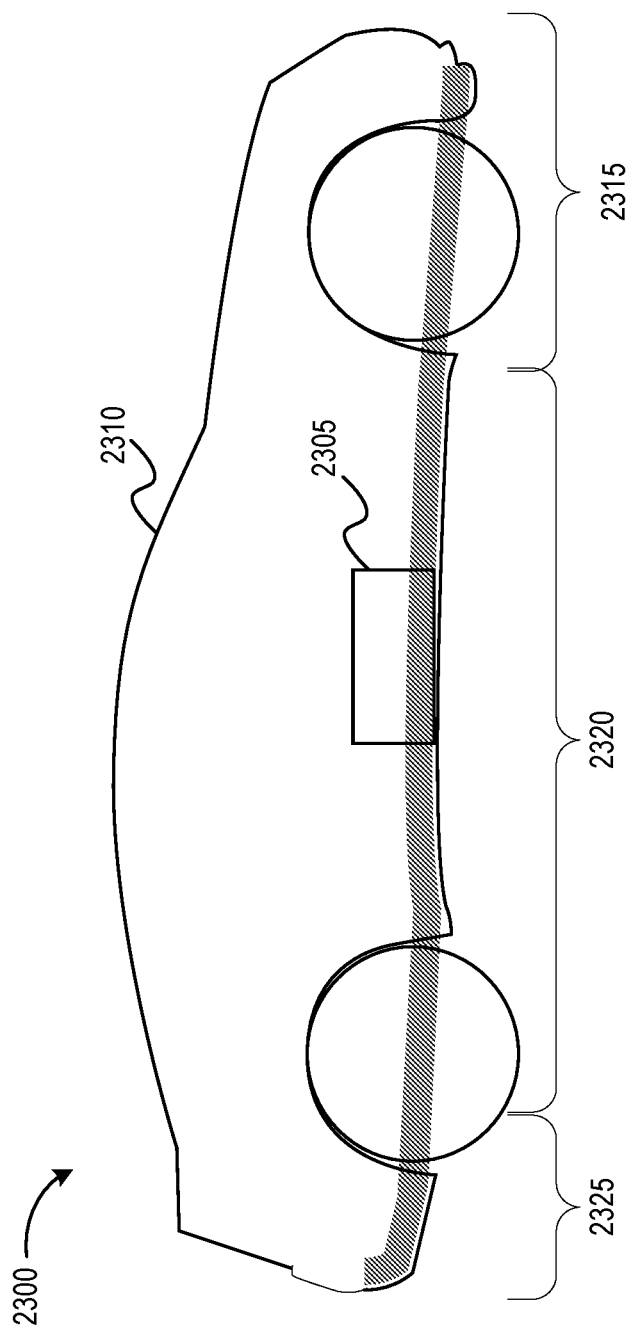
FIG. 23 depicts a block diagram of a cross-sectional view of an example electric vehicle installed with an induction motor.

Referring now to FIG. 23, a cross-sectional view of an electric vehicle 2300 installed with an induction motor 2305 is depicted. The induction motor 2305 can include a centrifugally cast rotor assembly as described and depicted above according to any of the FIGS. 1-22. The electric vehicle 2300 can include a chassis 2310 (e.g., a frame, internal frame, or support structure). The chassis 2310 can support various components of the electric vehicle 2300. The chassis 2310 can span a front portion 2315 (e.g., a hood or bonnet portion), a body portion 2320, and a rear portion 2325 (e.g., a trunk portion) of the electric vehicle 2300. The induction motor 2305 can be installed or placed within the electric vehicle 2300. The induction motor 2305 can be installed on the chassis 2310 of the electric vehicle 2300 within the front portion 2315, the body portion 2320, or the rear portion 2325.

Figure 24:
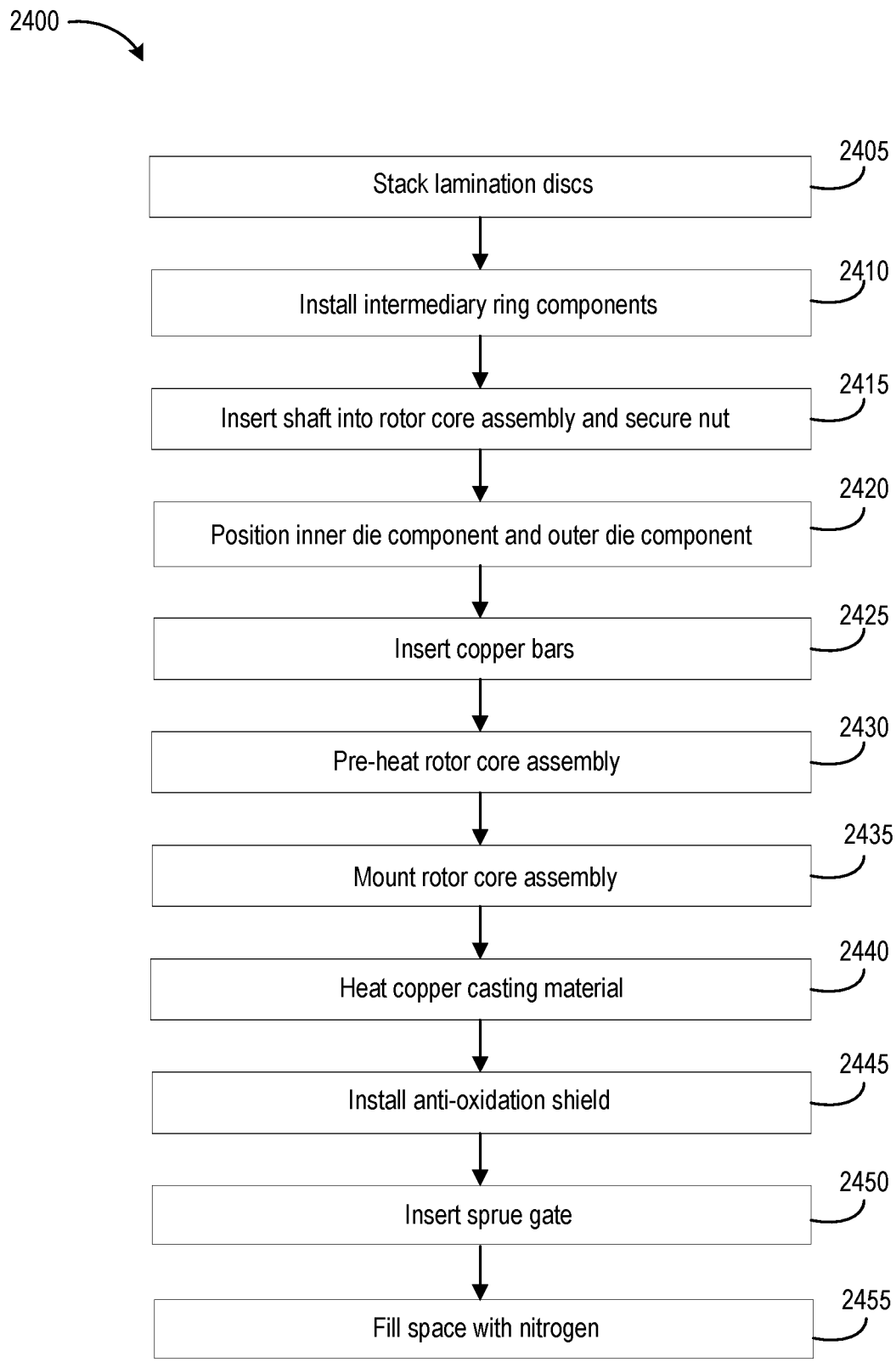
FIG. 24 depicts a flow diagram of an example method for initiating a centrifugal casting process for a rotor assembly of an induction motor in an electric vehicle.

FIG. 24 depicts a flow diagram of a method 2400 of initiating a centrifugal casting process for a rotor core assembly 1200 of an induction motor. The method 2400 can be performed or implemented using the components detailed above in conjunction with FIGS. 1-23. The method 2400 can include stacking multiple lamination discs (ACT 2405). For example, the multiple lamination discs can be stacked and compressed using a press machine to form a rotor core assembly 115. The lamination discs of the rotor core assembly 115 can be coated with an oxide in order to electrically insulate the metal discs from each other. Electrically insulating spacer discs can also be placed between adjacent metal discs.

The method 2400 can include installing intermediary end ring components (ACT 2410). For example, the end ring components can be installed at both ends of the rotor core assembly 1200. A technician can manually dispose a first intermediary end ring 120 such that an interior surface of the first intermediary end ring 120 contacts the first end surface 112 proximate the first end 101 of the rotor lamination stack 115. Similarly, a technician can manually dispose a second intermediary end ring 125 such that an interior surface of the second intermediary end ring 125 contacts the second end surface 118 proximate the second end 103 of the rotor lamination stack 115.

The method 2400 can include inserting a hollow shaft 1350 into the rotor core assembly 1200 and securing a nut (ACT 2415). For example, the nut can be lock nut 1355. The centrifugal casting process can commence by casting the end ring at the first end 101 (i.e., proximate the first intermediary end ring 120). Therefore, the shaft portion 1356 of the hollow shaft 1350 can be first inserted through the first intermediary end ring 120, next through the rotor lamination stack 115, and finally through the second intermediary end ring 125. In some examples presented herein, the lock nut 1355 can be secured by a technician by finger tightening the lock nut 1355 flush against an exterior surface of the second intermediary ring 125. In other examples presented herein, the lock nut 1355 can be secured flush against the exterior surface of the second intermediary ring using a tool (e.g., an adjustable wrench, a combination wrench, an open-end wrench, a ratchet wrench, a torque wrench). For example, a torque wrench can be used to tighten the lock nut 1355 to specified torque ranging from 100 N-m to 800 N-m.

The method 2400 can include positioning an inner die component 1345 and an outer die component 1340 (ACT 2420). The inner die component 1345 and the outer die component 1340 can be installed at the first end 101 of the rotor core assembly 1200. For example, a technician can locate the inner die component 1345 such that the inner circumferential wall 1915 is retained within an interior surface of the shaft portion 1356 of the hollow shaft 1350 using a friction fit. The technician can subsequently locate the outer die component 1340 such that the outer circumferential wall 2110 is retained on outer circumferential surfaces of the rotor lamination stack 115 using a friction fit. In some embodiments, a mold coating can be sprayed between the inner die component 1345 and the outer die component 1340. The mold coating can aid acceleration of molten metal, produce a specific surface finish, and enable easy extraction of the cast end ring from the die components 1340 and 1345.

The method 2400 can include inserting copper bars 130 (ACT 2425). The copper bars 130 can be inserted into rotor slots of the rotor core assembly 1200. For example, a technician can insert each copper bar 130 through the intermediary end rings 120, 125 and the rotor lamination stack 115 until each rotor slot 1610 is populated by a copper bar 130. A machine with tooling designed for gripping and inserting the copper bars 130 can also be utilized.

The method 2400 can include pre-heating the rotor assembly 1200 (ACT 2430). For example, the pre-heating step can be accomplished by placing the rotor assembly 1200 into a kiln (not shown). In some examples presented herein, the pre-heating step can include heating the rotor assembly 1200 to a temperature ranging from 600° C. to 800° C. During the pre-heating step, the copper bars 130 can expand to fill the rotor slots 1610. Once the copper bars 130 have expanded into the rotor slots 1610, the copper bars 130 can be fixedly coupled with the rotor lamination stack 115 and the intermediary end rings 120, 125.

The method 2400 can include mounting the rotor core assembly 1200 (ACT 2435). For example, the rotor core assembly 1200 can be mounted to a spinner assembly 905. Mounting the rotor core assembly 1200 can include a technician removing the upper plate assembly 1230 from the spinner assembly 905 (i.e., removing the fasteners securing the first arm portion 1240 to the first upper portion 1220 and the second arm portion 1245 to the second upper portion 1225). The technician can next place the rotor core assembly 1200 atop the base plate assembly 1205 such that the spindle component 1305 mates with the central projection 2120 of the outer die component 1340, and the rotor core assembly 1200 can rotate freely with the spindle component 1305. The mounting process can conclude with the technician replacing the upper plate assembly 1230 on the spinner assembly 905 (i.e., replacing the fasteners securing the first arm portion 1240 to the first upper portion 1220 and the second arm portion 1245 to the second upper portion 1225).

The method 2400 can include heating copper casting material (ACT 2440). For example, a technician can place pellets of copper casting material into a furnace crucible (not shown). The copper casting material can be oxygen-free electrolytic copper, which can be referred to as OFE or C10100 copper. OFE copper has the highest purity for standardized copper and has a purity grade of 99.99%. In some examples presented herein, the copper casting material can be heated to a temperature ranging from 1100° C. to 1200° C.

The method 2400 can include installing an anti-oxidation shield 925 (ACT 2445). For example, the anti-oxidation shield 925 can be installed over the casting apparatus 900. Installing the anti-oxidation shield 925 can include positioning the main body portion 930 over the spinner assembly 905, the motor assembly 910, and the rotor assembly 1200.

The method 2400 can include inserting a sprue gate 920 (ACT 2450). The sprue gate 920 can be inserted into the rotor core assembly 1200. For example, a technician can insert the neck portion 1335 of the sprue gate 920 through the shaft portion 1356 of the hollow shaft 1350. In some instances, the sprue gate 920 can be retained with the rotor core assembly 1200 using thermally resistive tongs or any other suitable mechanical structure.

The method 2400 can include filling a space with anti-oxidation gas (ACT 2455). In some instances, the anti-oxidation gas can fill the space encapsulated by the anti-oxidation shield 925. The anti-oxidation gas can be pure nitrogen, or a nitrogen-containing mixture. The gas can also be a pure gas or a mixture containing one of the following: argon, chlorine, Freon, or hexachloroethane.

Figure 25:
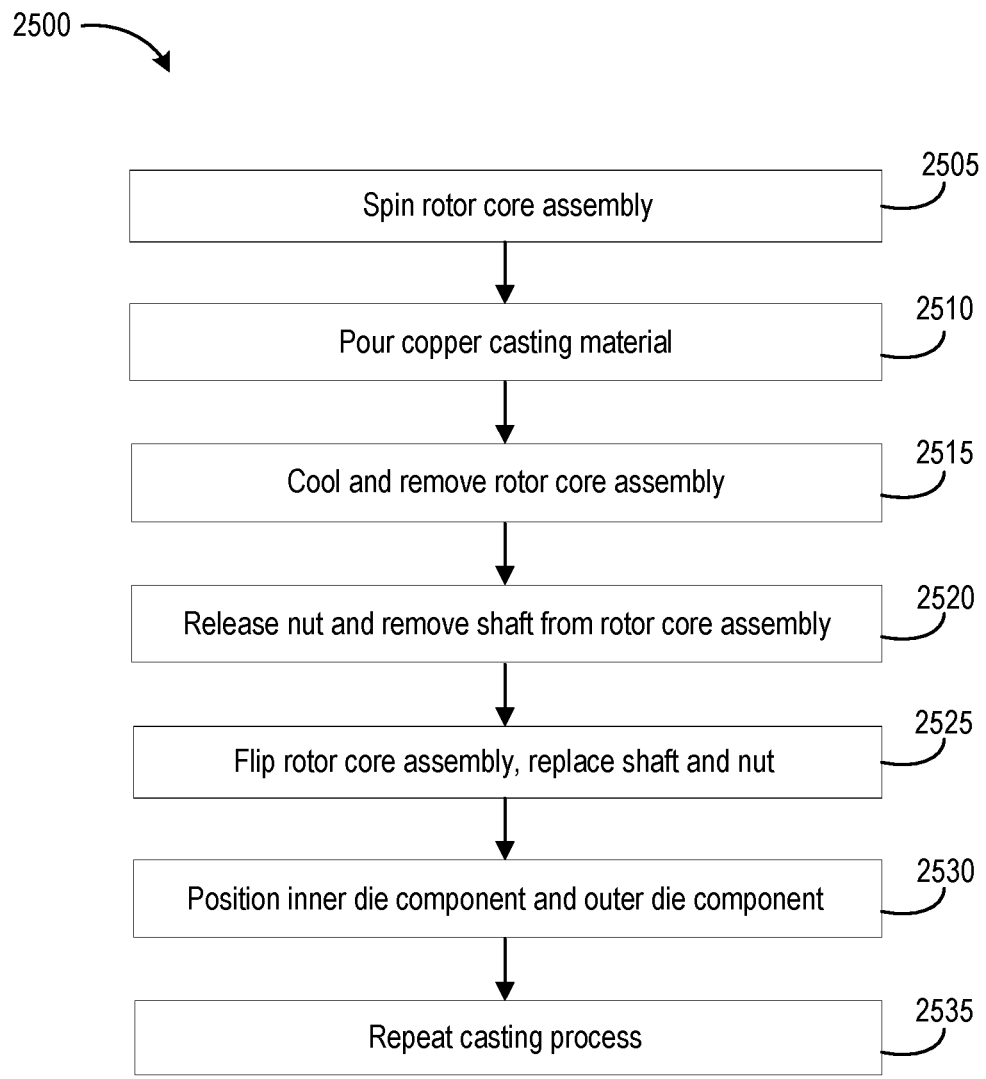
FIG. 25 depicts a flow diagram of an example method for centrifugally casting a rotor assembly of an induction motor in an electric vehicle.

FIG. 25 depicts a flow diagram of a method 2500 of centrifugally casting a rotor assembly 1200 of an induction motor in an electric vehicle. The method 2500 can be performed or implemented using the components detailed above in conjunction with FIGS. 1-23. In some examples presented herein, the method 2500 is performed immediately subsequent the performance of the method 2400. The method 2500 can include spinning the rotor core assembly 1200 (ACT 2505). For example, spinning the rotor core assembly 1200 can include a technician operating the motor assembly 910. Operating the motor assembly 910 can cause rotation of the drive wheel 965, which can transmit power to the drive belt 915. The drive belt 915 can transmit a rotational force to the drive wheel assembly 1250, which can be transmitted to the rotor core assembly 1200 through the coupling of the inner drive wheel component 1325 to the lock nut 1355. In some examples presented herein, the drive speed provided by the motor assembly 910 is sufficient to rotate the rotor core assembly 1200 at a speed ranging from 2500 revolutions per minute (RPM) to 3000 RPM.

The method 2500 can include pouring copper casting material (ACT 2510). For example, the copper casting material can be poured through the sprue gate 920 and into the rotor core assembly 1200. The molten copper casting material can be transferred from the furnace crucible to a ladle, and a technician can use the ladle to pour the molten copper through the funnel portion 1330 and the neck portion 1335 of the sprue gate 920. The neck portion 1335 deposits the molten copper through the central bore 109 and into the region 1360 between the inner die component 1345 and the outer die component 1340. Performing the centrifugal casting process at a lowest possible pouring temperature can reduce the size of the copper grains in the finished end rings. After the copper casting material is poured into the region 1360 between the inner die component 1345 and the outer die component 1340, solidification takes place from the outer circumferential wall 2110 of the outer die component 1340, to the inner circumferential wall 1915 of the inner die component 1345.

The method 2500 can include cooling and removing the rotor core assembly 1200 (ACT 2515). For example, the rotor core assembly 1200 can be cooled and removed from the spinner assembly 905. A technician can determine when to halt the spinning process and begin the cooling process based on the visibility of copper in the region of the outgassing ports 2115 of the outer die component 1340. For example, the spinning process can be halted and the cooling process can begin after the rotor core assembly 1200 has been spinning for a period ranging from 30 seconds to five minutes. In an example instance, the spinning period can be one minute. The cooling period for the rotor core assembly 1200 can range from 180 minutes to 600 minutes. The rotor core assembly 1200 can be air cooled to room temperature without the use of coolants or refrigerant equipment, as artificial acceleration of the cooling process can reduce the quality of the casted end ring. Removing the rotor core assembly 1200 from the spinner assembly can include a technician removing the upper plate assembly 1230 from the spinner assembly 905 (i.e., removing the fasteners securing the first arm portion 1240 to the first upper portion 1220 and the second arm portion 1245 to the second upper portion 1225). Once the upper plate assembly 1230 has been removed from the spinner assembly 905, the outer die component 1340 can be unmated from the spindle component 1305 and the rotor core assembly 1200 can be removed from the spinner assembly 905.

The method 2500 can include releasing the nut and removing the shaft 1350 from the rotor core assembly 1200 (ACT 2520). For example, the nut can be lock nut 1355. A technician can release the lock nut 1355 by hand or through the use of an appropriate tool. Prior to removing the hollow shaft 1350 from the rotor core assembly 1200, the technician can remove the outer die component 1340 and the inner die component 1345 to reveal the first centrifugally cast copper end ring 105. In some examples presented herein, a technician can also perform various inspection steps to ensure the quality of the first centrifugally cast end ring 105. For example, the technician can inspect qualities including, but not limited to, the porosity and grain size of the first centrifugally cast end ring 105.

The method 2500 can include flipping the rotor core assembly 1200 and replacing the shaft 1350 and the nut (ACT 2525). For example, the nut can be lock nut 1355. By flipping the rotor core assembly 1200, the shaft portion 1356 of the hollow shaft 1350 can be first inserted through the second intermediary end ring 125, next through the rotor lamination stack 115, and finally through the first intermediary end ring 120. In some examples presented herein, the lock nut 1355 can be secured by a technician by finger tightening the lock nut 1355 flush against an exterior surface of the first intermediary ring 120. In other examples presented herein, the lock nut 1355 can be secured flush against the exterior surface of the first intermediary ring 120 using a tool (e.g., an adjustable wrench, a combination wrench, an open-end wrench, a ratchet wrench, a torque wrench). For example, a torque wrench can be used to tighten the lock nut 1355 to specified torque ranging from 100 N-m to 800 N-m.

The method 2500 can include positioning the inner die component 1345 and the outer die component 1340 (ACT 2530). For example, the inner die component 1345 and the outer die component 1340 can be installed at the second end 103 of the rotor core assembly 1200. A technician can locate the inner die component 1345 such that the inner circumferential wall 1915 is retained within an interior surface of the shaft portion 1356 of the hollow shaft 1350 using a friction fit. The technician can subsequently locate the outer die component 1340 such that the outer circumferential wall 2110 is retained on outer circumferential surfaces of the rotor lamination stack 115 using a friction fit. In some embodiments, a mold coating can be sprayed between the inner die component 1345 and the outer die component 1340. The mold coating can aid acceleration of molten metal, produce a specific surface finish, and enable easy extraction of the cast end ring from the die components 1340 and 1345.

The method 2500 can include repeating the centrifugal casting process (ACT 2535). For example, the centrifugal casting process can be repeated for the second end 103 of the rotor core assembly 1200. Repeating the centrifugal casting process for the second end of the rotor core assembly can include repeating the performance of ACTS 2435-2450 of method 2400 and the performance of ACTS 2505-2520 of method 2500 to form the second centrifugally cast end ring 110. In some examples presented herein, every step inclusive of ACTS 2435-2450 and 2505-2520 are performed for the second end 103 of the rotor core assembly 1200. In other examples, one or more steps can be omitted.

Method 2500 can conclude by performing a surface finishing process on the first centrifugally cast end ring 105 and the second centrifugally cast end ring 110. For example, the surface finishing process could include one or more of the following processes: abrasive blasting, sandblasting, burnishing, electropolishing, grinding, vibratory finishing, polishing, buffing, and shot peening. In some examples presented herein, the method 2500 can conclude with a technician performing various inspection steps to ensure the quality of the first centrifugally cast end ring 105 and the second centrifugally cast end ring 110. For example, the technician can inspect the porosity, grain size, structural strength, and finished dimensions of the end rings 105, 110. The centrifugal casting process generally results in good dimensional size control, and dimensional tolerances of ±1 mm can be achieved, meaning that the centrifugal casting processes described herein can be utilized in the mass production of centrifugally casted rotor assemblies.

Figure 26:
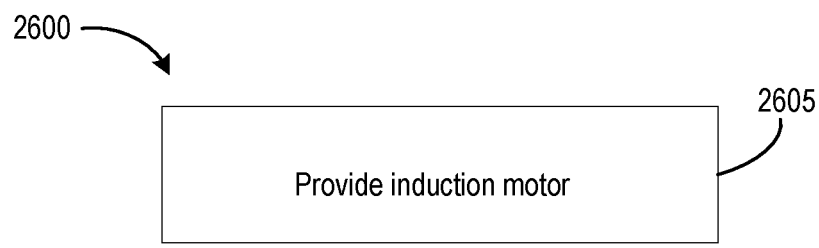
FIG. 26 depicts a flow diagram of an example method of providing an induction motor for an electric vehicle.

FIG. 26 depicts a method 2600 for providing an induction motor for an electric vehicle. The functionalities of the method 2600 can be implemented using the systems or apparatuses discussed above in conjunction with FIGS. 1-25. The method 2600 can include providing an induction motor 2305 (ACT 2605). The induction motor 2305 can be installed in an electric vehicle 2300. The induction motor 2305 can include a motor shaft, a stator assembly, and a rotor assembly 100. The rotor assembly 100 can include a rotor lamination stack 115 having a cylindrical shape that defines a central axis 106. The rotor lamination stack 115 can terminate in a first end surface 112 and a second end surface 118. The rotor assembly 100 can also include a central axial bore 109 that extends from the first end surface 112 of the rotor lamination stack 115 to the second end surface 118 of the rotor lamination stack 115. The rotor lamination stack 115 can include multiple lamination discs. Each of the lamination discs can include multiple rotor slots 1610. Multiple copper bars 130 can be disposed within the rotor slots 1610. Each copper bar 130 extends beyond the first end surface 112 and the second end surface 118. The rotor assembly 100 can also include a first intermediary ring 120 disposed at the first end surface 112, and a second intermediary ring 125 disposed at the second end surface 118. The rotor assembly can also include a centrifugally cast first copper end ring 105 that electrically and mechanically couples each of the copper bars 130 proximate the first end surface 112, and a centrifugally cast second copper end ring 110 that electrically and mechanically couples each of the copper bars 130 proximate the second end surface 118. Each of the centrifugally cast first copper end ring 105 and the centrifugally cast second copper end ring 110 can be formed using a centrifugal casting process after the copper bars 130 are inserted into the rotor slots 1610.

Figure 27:
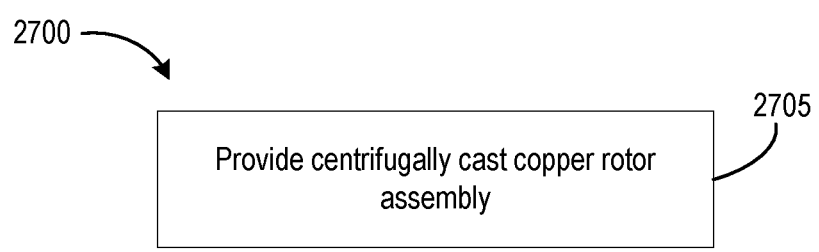
FIG. 27 depicts a flow diagram of an example method of providing a centrifugally cast copper rotor assembly of an induction motor in an electric vehicle.

FIG. 27 depicts a method 2700 for providing a centrifugally cast copper rotor assembly of an induction motor in an electric vehicle. The functionalities of the method 2700 can be implemented using the systems or apparatuses discussed above in conjunction with FIGS. 1-25. The method 2700 can include providing a centrifugally cast copper rotor assembly 100 (ACT 2705). The rotor assembly 100 can include a rotor lamination stack 115 having a cylindrical shape that defines a central axis 106. The rotor lamination stack 115 can terminate in a first end surface 112 and a second end surface 118. The rotor assembly 100 can also include a central axial bore 109 that extends from the first end surface 112 of the rotor lamination stack 115 to the second end surface 118 of the rotor lamination stack 115. The rotor lamination stack 115 can include multiple lamination discs. Each of the lamination discs can include multiple rotor slots 1610. Multiple copper bars 130 can be disposed within the rotor slots 1610. Each copper bar 130 extends beyond the first end surface 112 and the second end surface 118. The rotor assembly 100 can also include a first intermediary ring 120 disposed at the first end surface 112, and a second intermediary ring 125 disposed at the second end surface 118. The rotor assembly can also include a centrifugally cast first copper end ring 105 that electrically and mechanically couples each of the copper bars 130 proximate the first end surface 112, and a centrifugally cast second copper end ring 110 that electrically and mechanically couples each of the copper bars 130 proximate the second end surface 118. Each of the centrifugally cast first copper end ring 105 and the centrifugally cast second copper end ring 110 can be formed using a centrifugal casting process after the copper bars 130 are inserted into the rotor slots 1610.

Figure 28:
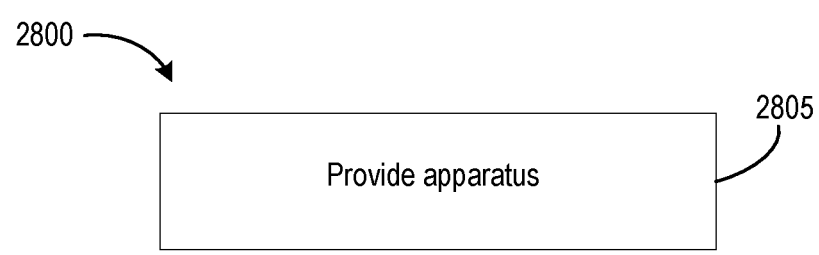
FIG. 28 depicts a flow diagram of an example method of providing an apparatus to centrifugally cast a copper rotor assembly of an induction motor in an electric vehicle.

FIG. 28 depicts a method 2800 for providing an apparatus to centrifugally cast a copper rotor assembly of an induction motor in an electric vehicle. The functionalities of the method 2800 can be implemented using the systems or apparatuses discussed above in conjunction with FIGS. 1-25. The method 2800 can include providing an apparatus 900 to centrifugally cast a copper rotor assembly (ACT 2805). The method can include providing a rotor assembly 1200 with a cylindrical shape that defines a central axis 106. The rotor assembly can terminate in a first end 101 and a second end 103. The method can include providing an inner die component 1345, and providing an outer die component 1340. Each of the inner die component 1345 and the outer die component 1340 can be disposed at the first end 101 of the rotor assembly. The method can include providing a spinner assembly 905. The spinner assembly 905 can include a lower structure 1205, an upper structure 1230, and a sidewall structure 1210. The lower structure 1205 can be disposed beneath the rotor assembly 1200 and can include a base plate 1300, a spindle component 1305 configured to mate with the outer die component 1340, and a first bearing assembly 1310. The first bearing assembly 1310 can include a first inner ring component 1313 and a first outer ring component 1316. The first outer ring component 1316 can be fixedly coupled with the base plate 1300 and the first inner ring component 1313 can be fixedly coupled with the spindle component 1305 such that the spindle component 1305 is permitted to rotate with the rotor assembly 1200 about the central axis 106 relative to the base plate 1300. The upper structure 1230 can be disposed above the rotor assembly 1200 and can include an upper plate 1235, a drive wheel component 1325 configured to mate with the rotor assembly 1200, and a second bearing assembly 1315. The second bearing assembly 1315 can include a second inner ring component 1318 and a second outer ring component 1321. The second outer ring component 1321 can be fixedly coupled with the upper plate 1235 and the second inner ring component 1318 can be fixedly coupled with the drive wheel component 1325 such that the drive wheel component 1325 is permitted to rotate with the rotor assembly 1200 about the central axis 106 relative to the upper plate 1235. The sidewall structure 1210 can couple the lower structure 1205 to the upper structure 1230. The method can further include providing a motor 910 that drive rotation of the drive wheel component 1325.

Figure 29:
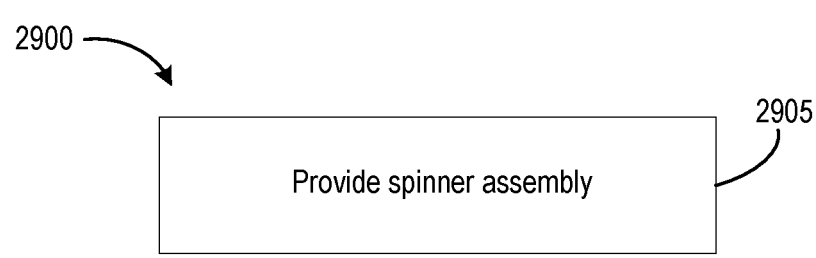
FIG. 29 depicts a flow diagram of an example method of providing a spinner assembly for use in the centrifugal casting process of a copper rotor assembly of an induction motor in an electric vehicle.

FIG. 29 depicts a method 2900 for providing a spinner assembly 905 for use in the centrifugal casting process of a copper rotor assembly of an induction motor in an electric vehicle (ACT 2905). The functionalities of the method 2900 can be implemented using the systems or apparatuses discussed above in conjunction with FIGS. 1-25. The spinner assembly 905 can include a lower structure 1205, an upper structure 1230, and a sidewall structure 1210. The lower structure 1205 can be disposed beneath the rotor assembly 1200 and can include a base plate 1300, a spindle component 1305 configured to mate with the outer die component 1340, and a first bearing assembly 1310. The first bearing assembly 1310 can include a first inner ring component 1313 and a first outer ring component 1316. The first outer ring component 1316 can be fixedly coupled with the base plate 1300 and the first inner ring component 1313 can be fixedly coupled with the spindle component 1305 such that the spindle component 1305 is permitted to rotate with the rotor assembly 1200 about the central axis 106 relative to the base plate 1300. The upper structure 1230 can be disposed above the rotor assembly 1200 and can include an upper plate 1235, a drive wheel component 1325 configured to mate with the rotor assembly 1200, and a second bearing assembly 1315. The second bearing assembly 1315 can include a second inner ring component 1318 and a second outer ring component 1321. The second outer ring component 1321 can be fixedly coupled with the upper plate 1235 and the second inner ring component 1318 can be fixedly coupled with the drive wheel component 1325 such that the drive wheel component 1325 is permitted to rotate with the rotor assembly 1200 about the central axis 106 relative to the upper plate 1235. The sidewall structure 1210 can couple the lower structure 1205 to the upper structure 1230.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A rotor assembly for an induction motor of an electric vehicle, comprising:
   a rotor lamination stack having a cylindrical shape that defines a central axis, the rotor lamination stack terminates in a first end surface and a second end surface,
   a central axial bore extends from the first end surface of the rotor lamination stack to the second end surface of the rotor lamination stack;
   the rotor lamination stack has a plurality of lamination discs, each of the plurality of lamination discs having a plurality of rotor slots;
   a plurality of copper bars disposed within the plurality of rotor slots, each of the plurality of copper bars extends beyond the first end surface of the rotor lamination stack and beyond the second end surface of the rotor lamination stack;
   a first intermediary end ring disposed at the first end surface of the rotor lamination stack, the first intermediary end ring having multiple rotor slots;
   a second intermediary end ring disposed at the second end surface of the rotor lamination stack, the second intermediary end ring having multiple rotor slots;
   a centrifugally cast first copper end ring that electrically and mechanically couples each of the plurality of copper bars proximate the first end surface of the rotor lamination stack;
   an interior face of the centrifugally cast first copper end ring having a plurality of recesses to couple with the plurality of copper bars;
   an exterior face of the centrifugally cast first copper end ring having an entirely solid surface;
   an exterior surface of the first intermediary end ring directly contacts the interior face of the centrifugally cast first copper end ring;
   an inner circumferential face of the centrifugally cast first copper end ring having a plurality of cooling fins distributed about the inner circumferential face, each of the plurality of cooling fins extending radially toward the central axial bore;
   a centrifugally cast second copper end ring that electrically and mechanically couples each of the plurality of copper bars proximate the second end surface of the rotor lamination stack;
   an interior face of the centrifugally cast second copper end ring having a plurality of recesses to couple with the plurality of copper bars;
   an exterior face of the centrifugally cast second copper end ring having an entirely solid surface;
   an exterior surface of the second intermediary end ring directly contacts the interior face of the centrifugally cast second copper end ring;
   an inner circumferential face of the centrifugally cast second copper end ring having a plurality of cooling fins distributed about the inner circumferential face, each of the plurality of cooling fins extending radially toward the central axial bore; and
   each of the centrifugally cast first copper end ring and the centrifugally cast second copper end ring centrifugally casted with the plurality of copper bars inserted into the plurality of rotor slots, the plurality of copper bars inserted into the multiple rotor slots of the first intermediary end ring, and the plurality of copper bars inserted into the multiple rotor slots of the second intermediary end ring.

2. The rotor assembly of claim 1, comprising:
   the centrifugally cast first copper end ring and the centrifugally cast second copper end ring comprising the plurality of cooling fins, each of the plurality of cooling fins having a rectangular shape with rounded edges.

3. The rotor assembly of claim 1, comprising:
   the first intermediary end ring and the second intermediary end ring fabricated from at least one of stainless steel or electric steel.

4. The rotor assembly of claim 1, comprising:
   each of the first intermediary end ring and the second intermediary end ring has a thickness ranging from 1 mm to 5 mm.

5. The rotor assembly of claim 1, comprising:
   the rotor lamination stack has a height ranging from 100 mm to 155 mm.

6. The rotor assembly of claim 1, comprising:
   each of the plurality of lamination discs has an outer diameter ranging from 132 mm to 155 mm.

7. The rotor assembly of claim 1, comprising:
   the rotor lamination stack has a central axial bore diameter ranging from 40 mm to 50 mm.

8. The rotor assembly of claim 1, comprising:
   each of the plurality of rotor slots has a slot height ranging from 18 mm to 22 mm.

9. The rotor assembly of claim 1, comprising:
   each of the plurality of rotor slots has a tapered shape with a first end slot width ranging from 1 mm to 2.5 mm and a second end slot width ranging from 2 mm to 5 mm.

10. The rotor assembly of claim 1, comprising:
    each of the plurality of copper bars is fabricated from oxygen-free electrolytic copper.

11. An electric vehicle, comprising:
    an induction motor to drive an electric vehicle, comprising:
      a motor shaft;
      a stator assembly;
      a rotor assembly, comprising:
        a rotor lamination stack having a cylindrical shape that defines a central axis, the rotor lamination stack terminates in a first end surface and a second end surface,
        a central axial bore extends from the first end surface of the rotor lamination stack to the second end surface of the rotor lamination stack;
        the rotor lamination stack has a plurality of lamination discs, each of the plurality of lamination discs having a plurality of rotor slots;
        a plurality of copper bars disposed within the plurality of rotor slots, each of the plurality of copper bars extends beyond the first end surface of the rotor lamination stack and beyond the second end surface of the rotor lamination stack;
        a first intermediary end ring disposed at the first end surface of the rotor lamination stack, the first intermediary end ring having multiple rotor slots;
        a second intermediary end ring disposed at the second end surface of the rotor lamination stack, the second intermediary end ring having multiple rotor slots;
        a centrifugally cast first copper end ring that electrically and mechanically couples each of the plurality of copper bars proximate the first end surface of the rotor lamination stack;

an interior face of the centrifugally cast first copper end ring having a plurality of recesses to couple with the plurality of copper bars;

an exterior face of the centrifugally cast first copper end ring having an entirely solid surface;

an exterior surface of the first intermediary end ring directly contacts the interior face of the centrifugally cast first copper end ring;

an inner circumferential face of the centrifugally cast first copper end ring having a plurality of cooling fins distributed about the inner circumferential face, each of the plurality of cooling fins extending radially toward the central axial bore;

a centrifugally cast second copper end ring that electrically and mechanically couples each of the plurality of copper bars proximate the second end surface of the rotor lamination stack;

an interior face of the centrifugally cast second copper end ring having a plurality of recesses to couple with the plurality of copper bars;

an exterior face of the centrifugally cast second copper end ring having an entirely solid surface;

an exterior surface of the second intermediary end ring directly contacts the interior face of the centrifugally cast second copper end ring;

an inner circumferential face of the centrifugally cast second copper end ring having a plurality of cooling fins distributed about the inner circumferential face, each of the plurality of cooling fins extending radially toward the central axial bore; and each of the centrifugally cast first copper end ring and the centrifugally cast second copper end ring centrifugally casted with the plurality of copper bars inserted into the plurality of rotor slots, the plurality of copper bars inserted into the multiple rotor slots of the first intermediary end ring, and the plurality of copper bars inserted into the multiple rotor slots of the second intermediary end ring.

* * * * *